United States Patent
Nam et al.

(10) Patent No.: US 11,910,402 B2
(45) Date of Patent: *Feb. 20, 2024

(54) FEEDBACK TECHNIQUES FOR GROUP-COMMON PDCCH TRANSMISSIONS

(71) Applicant: QUALCOMM Incorporated, San Diego, CA (US)

(72) Inventors: Wooseok Nam, San Diego, CA (US); Tao Luo, San Diego, CA (US); Peter Pui Lok Ang, San Diego, CA (US); Linhai He, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,053

(22) Filed: Nov. 28, 2022

(65) Prior Publication Data

US 2023/0117228 A1    Apr. 20, 2023

Related U.S. Application Data

(63) Continuation of application No. 17/146,328, filed on Jan. 11, 2021, now Pat. No. 11,540,266.

(Continued)

(51) Int. Cl.
*H04W 72/23* (2023.01)
*H04L 1/1812* (2023.01)

(52) U.S. Cl.
CPC ........... *H04W 72/23* (2023.01); *H04L 1/1812* (2013.01)

(58) Field of Classification Search
CPC .................. H04L 1/1812; H04W 72/042
See application file for complete search history.

(56) References Cited

U.S. PATENT DOCUMENTS 11,540,266 B2 * 12/2022 Nam ..................... H04L 1/1812
2021/0219273 A1    7/2021 Nam et al.

FOREIGN PATENT DOCUMENTS

WO    WO2021142589 A1    7/2021

OTHER PUBLICATIONS

Ericsson: "DL Signals and Channels for NR-U", 3GPP TSG-RAN WG1 Meeting #98bis, 3GPP Draft; R1-1912707, 3rd Generation Partnership Project (3GPP), Mobile Competence Centre, 650, Route Des Lucioles, F-06921 Sophia-Antipolis Cedex; France, vol. RAN WG1, No. Reno, USA; Nov. 18, 2019-Nov. 22, 2019, Nov. 9, 2019 (Nov. 9, 2019), pp. 1-25, XP051823551, section 3.

(Continued)

*Primary Examiner* — Elton Williams
(74) *Attorney, Agent, or Firm* — Holland & Hart LLP

(57) ABSTRACT

A user equipment (UE) may receive a first group downlink control information transmission associated with a UE group, where the first group downlink control information transmission may reference a second group downlink control information transmission (e.g., according to a pre-notification indication). The UE may determine a feedback condition for the second group downlink control information transmission and monitor for the second group downlink control information transmission. Alternatively, the UE may receive a second group downlink control information transmission referencing the first group downlink control information transmission (e.g., according to a post-confirmation indication), and the UE may determine a feedback condition for the first group downlink control information transmission. Based on the feedback condition, the UE may transmit feedback information, for example, indicating that the UE did not correctly receive the indicated group downlink control information transmission.

20 Claims, 17 Drawing Sheets

Related U.S. Application Data

(60) Provisional application No. 62/961,105, filed on Jan. 14, 2020.

(56) References Cited

OTHER PUBLICATIONS

Huawei, et al., "DL Channels and Signals in NR Unlicensed Band", 3GPP TSG RAN WG1 Meeting #98, 3GPP Draft; R1-1908107, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 26, 2019-Aug. 30, 2019, 20 Pages, Aug. 17, 2019 (Aug. 17, 2019), XP051764727, section 3.
International Preliminary Report on Patentability—PCT/US2021/013099—The International Bureau of WIPO—Geneva, Switzerland—dated Jul. 28, 2022.
International Search Report and Written Opinion—PCT/US2021/013099—ISA/EPO—dated Apr. 26, 2021.

\* cited by examiner

FEEDBACK TECHNIQUES FOR GROUP-COMMON PDCCH TRANSMISSIONS

CROSS REFERENCE

The present Application for Patent is a Continuation of U.S. patent application Ser. No. 17/146,328 by NAM et al., entitled "FEEDBACK TECHNIQUES FOR GROUP-COMMON PDCCH TRANSMISSIONS" filed Jan. 11, 2021, which claims the benefit of U.S. Provisional Patent Application No. 62/961,105 by NAM, et al., entitled "FEEDBACK TECHNIQUES FOR CROUP-COMMON PDCCH TRANSMISSIONS", filed Jan. 14, 2020, each of which are assigned to the assignee hereof, and each of which are expressly incorporated herein.

BACKGROUND

The following relates generally to wireless communications, and more specifically to feedback techniques for group-common physical downlink control channel (PDCCH) transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-s-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support feedback techniques for group-common physical downlink control channel (PDCCH) transmissions. Generally, the described techniques provide for a user equipment (UE) receiving a first group downlink control information transmission associated with a UE group, where the first group downlink control information transmission may reference a second group downlink control information transmission (e.g., according to a pre-notification indication). The UE may determine a feedback condition for the second group downlink control information transmission and monitor for the second group downlink control information transmission. Alternatively, the UE may receive a second group downlink control information transmission referencing the first group downlink control information transmission (e.g., according to a post-confirmation indication), and the UE may determine a feedback condition for the first group downlink control information transmission. Based on the feedback condition, the UE may transmit feedback information, for example, indicating that the UE did not correctly receive the indicated group downlink control information transmission.

A method of wireless communication at a UE is described. The method may include receiving a first group downlink control information transmission associated with a UE group, the first group downlink control information transmission referencing a second group downlink control information transmission, determining a feedback condition for the second group downlink control information transmission based on the first group downlink control information transmission, monitoring for the second group downlink control information transmission based on the first group downlink control information transmission, and transmitting feedback information for the second group downlink control information transmission based on the monitoring and the determined feedback condition.

An apparatus for wireless communication at a UE is described. The apparatus may include a processor, memory coupled with the processor, and instructions stored in the memory. The instructions may be executable by the processor to cause the apparatus to receive a first group downlink control information transmission associated with a UE group, the first group downlink control information transmission referencing a second group downlink control information transmission, determine a feedback condition for the second group downlink control information transmission based on the first group downlink control information transmission, monitor for the second group downlink control information transmission based on the first group downlink control information transmission, and transmit feedback information for the second group downlink control information transmission based on the monitoring and the determined feedback condition.

Another apparatus for wireless communication at a UE is described. The apparatus may include means for receiving a first group downlink control information transmission associated with a UE group, the first group downlink control information transmission referencing a second group downlink control information transmission, determining a feedback condition for the second group downlink control information transmission based on the first group downlink control information transmission, monitoring for the second group downlink control information transmission based on the first group downlink control information transmission, and transmitting feedback information for the second group downlink control information transmission based on the monitoring and the determined feedback condition.

A non-transitory computer-readable medium storing code for wireless communication at a UE is described. The code may include instructions executable by a processor to receive a first group downlink control information transmission associated with a UE group, the first group downlink control information transmission referencing a second group downlink control information transmission, determine a feedback condition for the second group downlink control information transmission based on the first group downlink control information transmission, monitor for the second group downlink control information transmission based on the first group downlink control information transmission, and transmit feedback information for the second group downlink control information transmission based on the monitoring and the determined feedback condition.

Some examples of the method, apparatuses, and non-transitory computer-readable medium described herein may further include operations, features, means, or instructions for determining, based on the monitoring, that the second group downlink control information was not received, where the feedback information includes a negative acknowledgement.

In some examples of the method, apparatuses, and non-transitory computer-readable medium described herein, receiving the first group downlink control information transmission may include operations, features, means, or instructions for monitoring a first search space set for the first group downlink control information transmission.

In some examples of the method, apparatuses, and non-transitory computer-readable medium described herein, the first group downlink control information transmission, the second group downlink control information, or both, include a monitoring group indication.

Some examples of the method, apparatuses, and non-transitory computer-readable medium described herein may further include operations, features, means, or instructions for switching to a second search space set for monitoring by the UE based on the monitoring group indication.

Some examples of the method, apparatuses, and non-transitory computer-readable medium described herein may further include operations, features, means, or instructions for receiving a retransmission of at least a portion of the second group downlink control information based on transmitting the feedback information.

In some examples of the method, apparatuses, and non-transitory computer-readable medium described herein, the first group downlink control information transmission includes a different downlink control information format than the second group downlink control information transmission.

Some examples of the method, apparatuses, and non-transitory computer-readable medium described herein may further include operations, features, means, or instructions for determining a feedback condition for the previous group downlink control information transmission based on the first group downlink control information transmission.

In some examples of the method, apparatuses, and non-transitory computer-readable medium described herein, the first group downlink control information transmission references the second group downlink control information transmission using a pre-notification indication.

In some examples of the method, apparatuses, and non-transitory computer-readable medium described herein, the pre-notification indication includes a single bit indication.

In some examples of the method, apparatuses, and non-transitory computer-readable medium described herein, the first group downlink control information transmission indicates a set of resources for transmitting the feedback information.

In some examples of the method, apparatuses, and non-transitory computer-readable medium described herein, the second group downlink control information transmission may be in an immediately subsequent control channel opportunity to the first group downlink control information transmission.

A method of wireless communication at a UE is described. The method may include monitoring for a first group downlink control information transmission associated with a UE group, receiving a second group downlink control information transmission referencing the first group downlink control information transmission, determining a feedback condition for the first group downlink control information transmission based on the second group downlink control information transmission, and transmitting feedback information for the first group downlink control information transmission based on the monitoring and the determined feedback condition.

An apparatus for wireless communication at a UE is described. The apparatus may include a processor, memory coupled with the processor, and instructions stored in the memory. The instructions may be executable by the processor to cause the apparatus to monitor for a first group downlink control information transmission associated with a UE group, receive a second group downlink control information transmission referencing the first group downlink control information transmission, determine a feedback condition for the first group downlink control information transmission based on the second group downlink control information transmission, and transmit feedback information for the first group downlink control information transmission based on the monitoring and the determined feedback condition.

Another apparatus for wireless communication at a UE is described. The apparatus may include means for monitoring for a first group downlink control information transmission associated with a UE group, receiving a second group downlink control information transmission referencing the first group downlink control information transmission, determining a feedback condition for the first group downlink control information transmission based on the second group downlink control information transmission, and transmitting feedback information for the first group downlink control information transmission based on the monitoring and the determined feedback condition.

A non-transitory computer-readable medium storing code for wireless communication at a UE is described. The code may include instructions executable by a processor to monitor for a first group downlink control information transmission associated with a UE group, receive a second group downlink control information transmission referencing the first group downlink control information transmission, determine a feedback condition for the first group downlink control information transmission based on the second group downlink control information transmission, and transmit feedback information for the first group downlink control information transmission based on the monitoring and the determined feedback condition.

Some examples of the method, apparatuses, and non-transitory computer-readable medium described herein may further include operations, features, means, or instructions for determining, based on the monitoring, that the first group downlink control information transmission was not received, where the feedback information includes a negative acknowledgement.

In some examples of the method, apparatuses, and non-transitory computer-readable medium described herein, receiving the second group downlink control information transmission may include operations, features, means, or instructions for monitoring a first search space set for the second group downlink control information transmission.

In some examples of the method, apparatuses, and non-transitory computer-readable medium described herein, the second downlink control information transmission includes a monitoring group indication.

Some examples of the method, apparatuses, and non-transitory computer-readable medium described herein may further include operations, features, means, or instructions for switching to a second search space set for monitoring by the UE based on the monitoring group indication.

Some examples of the method, apparatuses, and non-transitory computer-readable medium described herein may further include operations, features, means, or instructions for receiving a retransmission of at least a portion of the first group downlink control information transmission based on transmitting the feedback information.

In some examples of the method, apparatuses, and non-transitory computer-readable medium described herein, the first group downlink control information transmission includes a different downlink control information format than the second group downlink control information transmission.

Some examples of the method, apparatuses, and non-transitory computer-readable medium described herein may further include operations, features, means, or instructions for determining a feedback condition for the third group downlink control information transmission based on the first group downlink control information transmission.

In some examples of the method, apparatuses, and non-transitory computer-readable medium described herein, the second group downlink control information transmission references the first group downlink control information transmission using a post-confirmation indication.

In some examples of the method, apparatuses, and non-transitory computer-readable medium described herein, the post-confirmation indication includes a single bit indication.

In some examples of the method, apparatuses, and non-transitory computer-readable medium described herein, the second group downlink control information transmission indicates a set of resources for transmitting the feedback information.

In some examples of the method, apparatuses, and non-transitory computer-readable medium described herein, the first group downlink control information transmission may be in a control channel opportunity immediately preceding the second group downlink control information transmission.

A method of wireless communication at a base station is described. The method may include transmitting a first group downlink control information transmission associated with a UE group, the first group downlink control information transmission referencing a second group downlink control information transmission, transmitting the second group downlink control information transmission based on the first group downlink control information transmission, and receiving feedback information for the second group downlink control information transmission.

An apparatus for wireless communication at a base station is described. The apparatus may include a processor, memory coupled with the processor, and instructions stored in the memory. The instructions may be executable by the processor to cause the apparatus to transmit a first group downlink control information transmission associated with a UE group, the first group downlink control information transmission referencing a second group downlink control information transmission, transmit the second group downlink control information transmission based on the first group downlink control information transmission, and receive feedback information for the second group downlink control information transmission.

Another apparatus for wireless communication at a base station is described. The apparatus may include means for transmitting a first group downlink control information transmission associated with a UE group, the first group downlink control information transmission referencing a second group downlink control information transmission, transmitting the second group downlink control information transmission based on the first group downlink control information transmission, and receiving feedback information for the second group downlink control information transmission.

A non-transitory computer-readable medium storing code for wireless communication at a base station is described. The code may include instructions executable by a processor to transmit a first group downlink control information transmission associated with a UE group, the first group downlink control information transmission referencing a second group downlink control information transmission, transmit the second group downlink control information transmission based on the first group downlink control information transmission, and receive feedback information for the second group downlink control information transmission.

Some examples of the method, apparatuses, and non-transitory computer-readable medium described herein may further include operations, features, means, or instructions for determining, based on receiving the feedback information, that the second group downlink control information was not received at the UE, where the feedback information includes a negative acknowledgement.

Some examples of the method, apparatuses, and non-transitory computer-readable medium described herein may further include operations, features, means, or instructions for transmitting a retransmission of at least a portion of the second group downlink control information based on transmitting the feedback information.

In some examples of the method, apparatuses, and non-transitory computer-readable medium described herein, the first group downlink control information transmission, the second group downlink control information, or both, include a monitoring group indication.

In some examples of the method, apparatuses, and non-transitory computer-readable medium described herein, the first group downlink control information transmission includes a different downlink control information format than the second group downlink control information transmission.

Some examples of the method, apparatuses, and non-transitory computer-readable medium described herein may further include operations, features, means, or instructions for receiving feedback information for the previous group downlink control information transmission.

In some examples of the method, apparatuses, and non-transitory computer-readable medium described herein, the first group downlink control information transmission references the second group downlink control information transmission using a pre-notification indication.

In some examples of the method, apparatuses, and non-transitory computer-readable medium described herein, the pre-notification indication includes a single bit indication.

In some examples of the method, apparatuses, and non-transitory computer-readable medium described herein, the first group downlink control information transmission indicates a set of resources for transmitting the feedback information.

In some examples of the method, apparatuses, and non-transitory computer-readable medium described herein, the second group downlink control information transmission may be in an immediately subsequent control channel opportunity to the first group downlink control information transmission.

A method of wireless communication at base station is described. The method may include transmitting a first group downlink control information transmission associated with a UE group, transmitting the second group downlink control information transmission, the second group downlink control information transmission referencing the first group downlink control information transmission, and receiving feedback information for the first group downlink control information transmission.

An apparatus for wireless communication at base station is described. The apparatus may include a processor, memory coupled with the processor, and instructions stored in the memory. The instructions may be executable by the processor to cause the apparatus to transmit a first group downlink control information transmission associated with a UE group, transmit the second group downlink control information transmission, the second group downlink control information transmission referencing the first group downlink control information transmission, and receive feedback information for the first group downlink control information transmission.

Another apparatus for wireless communication at base station is described. The apparatus may include means for transmitting a first group downlink control information transmission associated with a UE group, transmitting the second group downlink control information transmission, the second group downlink control information transmission referencing the first group downlink control information transmission, and receiving feedback information for the first group downlink control information transmission.

A non-transitory computer-readable medium storing code for wireless communication at base station is described. The code may include instructions executable by a processor to transmit a first group downlink control information transmission associated with a UE group, transmit the second group downlink control information transmission, the second group downlink control information transmission referencing the first group downlink control information transmission, and receive feedback information for the first group downlink control information transmission.

Some examples of the method, apparatuses, and non-transitory computer-readable medium described herein may further include operations, features, means, or instructions for determining, based on receiving the feedback information, that the first group downlink control information transmission was not received at the UE, where the feedback information includes a negative acknowledgement.

Some examples of the method, apparatuses, and non-transitory computer-readable medium described herein may further include operations, features, means, or instructions for retransmitting at least a portion of the first group downlink control information transmission based on transmitting the feedback information.

In some examples of the method, apparatuses, and non-transitory computer-readable medium described herein, the first group downlink control information transmission, the second group downlink control information, or both, include a monitoring group indication.

In some examples of the method, apparatuses, and non-transitory computer-readable medium described herein, the first group downlink control information transmission includes a different downlink control information format than the second group downlink control information transmission.

Some examples of the method, apparatuses, and non-transitory computer-readable medium described herein may further include operations, features, means, or instructions for receiving feedback information for the third group downlink control information transmission.

In some examples of the method, apparatuses, and non-transitory computer-readable medium described herein, the first group downlink control information transmission references the second group downlink control information transmission using a post-confirmation indication.

In some examples of the method, apparatuses, and non-transitory computer-readable medium described herein, the post-confirmation indication includes a single bit indication.

In some examples of the method, apparatuses, and non-transitory computer-readable medium described herein, the second group downlink control information transmission indicates a set of resources for transmitting the feedback information.

In some examples of the method, apparatuses, and non-transitory computer-readable medium described herein, the first group downlink control information transmission may be in a control channel opportunity immediately preceding the second group downlink control information transmission.

DETAILED DESCRIPTION

Figure 1:
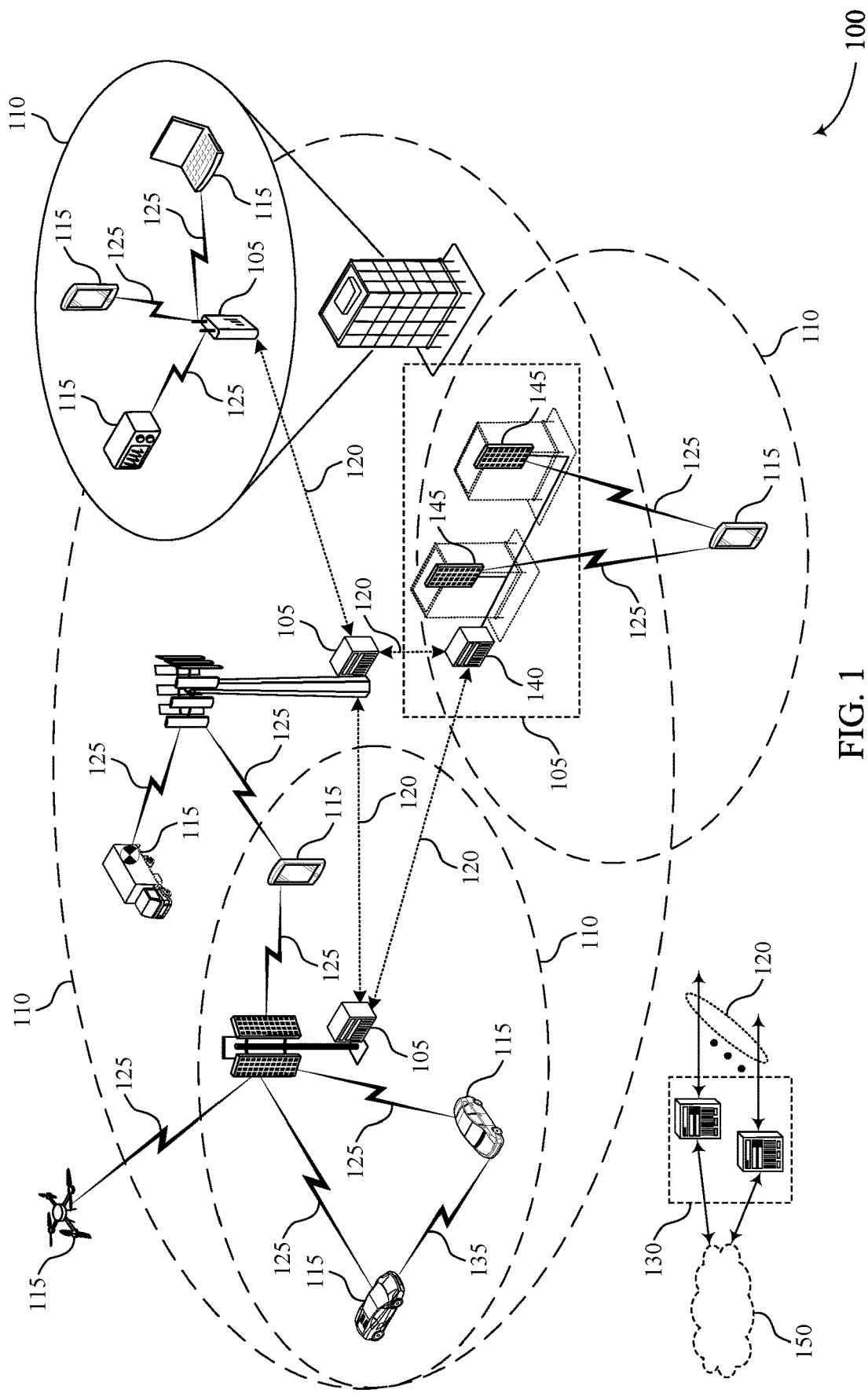
FIG. 1 illustrates an example of a wireless communications system that supports feedback techniques for group-common PDCCH transmissions in accordance with aspects of the present disclosure.

Wireless communications systems may include multiple communication devices such as user equipments (UEs) and base stations, which may provide wireless communication services to the UEs. For example, such base stations may be next-generation NodeBs or giga-NodeBs (either of which may be referred to as a gNB) that may support multiple radio access technologies (RATs) including fourth generation (4G) systems, such as Long Term Evolution (LTE) systems, as well as fifth generation (5G) systems, which may be referred to as New Radio (NR) systems.

Control information from a base station may be transmitted using resources defined by a search space. A search space may include a common search space configured for multiple UEs and a specific search space configured for a specific UE. In some examples, UEs may monitor one or more control regions of a search space to receive control information or data, or both on a physical channel (e.g., a physical downlink control channel (PDCCH), a physical downlink shared channel (PDSCH), etc.).

A control region (for example, a control resource set (CORESET)) for a physical channel may be defined by a number of symbol durations and may extend across a system bandwidth or a subset of the system bandwidth. One or more control regions may be configured for multiple UEs. For example, UEs may monitor or search control regions for control information according to one or more search space sets, and each search space set may include one or multiple control channel candidates (e.g., PDCCH candidates) in one or more aggregation levels. An aggregation level for a control channel candidate may refer to a number of control channel resources (for example, control channel elements) associated with encoded information for a control information format having a given payload size.

In some cases, a base station may transmit control information common to multiple UEs of a group of UEs, where the information may be used similarly for each of the UEs of the group, for example, in a group-common PDCCH. In some cases, a UE may be configured with multiple different groups of search space sets for monitoring for control information (e.g., in a group-common PDCCH), where the UE may use and switch between the different groups of search space sets. A group of search sets may, in some cases, be referred to as a monitoring group.

In some cases, the UE may be configured to switch between different monitoring groups including different search space sets. For example, the base station may transmit an explicit indication to the UEs to switch monitoring groups. Additionally or alternatively, an inactivity timer can be configured for implicit switching. For example, a UE may be configured such that the UE starts the inactivity timer, and at an expiration of the timer, the UE may switch to the first monitoring group (e.g., a default monitoring group). However, the group-common PDCCH carrying the instruction to switch monitoring groups may not be configured with resources for transmitting feedback information (e.g., hybrid automatic repeat request (HARD) acknowledgement (ACK) or negative acknowledgment (NACK) feedback), a UE may be unable to indicate to the base station that the UE did not correctly receive the group-common PDCCH.

Thus, a failure by a UE to detect the group-common PDCCH may impact performance and power consumption of the UE, as the UE may then wait until a subsequent group-common PDCCH transmission to obtain updated control information. For example, if the group-common PDCCH indicating a monitoring group switch is missed, the UE may monitor PDCCH using incorrect (e.g., inefficient) PDCCH occasions. While the use of an inactivity timer may help the UE to return to a first monitoring group in such situations, this may cause a relative latency increase due to a recovery time until the expiration of the inactivity timer.

Accordingly, techniques are provided herein to improve the reliability for UEs to switch monitoring groups, which may accordingly provide power savings and latency improvements at the UEs. In some cases, the base station may transmit an indication to a UE to determine whether the UE has correctly received a group-common PDCCH, based on which the UE may reply to the base station with feedback information if the UE did not receive the corresponding group-common PDCCH. For example, a pre-notification indication may indicate to the receiving UE that one or more upcoming PDDCH occasions are to include group-common PDCCH transmissions. Additionally or alternatively, a post-confirmation indication may indicate to the UE that one or more previous PDDCH occasions included group-common PDCCH transmissions. According to the indication (or indications), the UE may determine whether it received the group-common PDCCH, and if the UE determines that it did not correctly receive the group-common PDCCH for the indication occasion (or occasions), the UE may transmit feedback to the base station indicating the missed or incorrect reception. According to the feedback, the base station may, for example, repeat transmission of the missed or incorrectly received group-common PDCCH.

Aspects of the disclosure are initially described in the context of a wireless communications system. Aspects of the disclosure are also described in the context of a monitoring timeline and a process flow that relate feedback techniques for group-common PDCCH transmissions. Aspects of the disclosure are further illustrated by and described with reference to apparatus diagrams, system diagrams, and flowcharts that relate to feedback techniques for group-common PDCCH transmissions.

FIG. 1 illustrates an example of a wireless communications system 100 that supports dynamic search spaces in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-s-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some cases, a base station may transmit control information common to multiple UEs 115 of a group of UEs 115, where the information may be used similarly for each of the UEs 115 of the group. Such a transmission may be referred to as a group-common transmission, such as a group-common PDCCH transmission. In some cases, a UE 115 may be configured with multiple different groups of search space sets for monitoring for control information (e.g., in a PDCCH), where the UE 115 may use and switch between the different groups of search space sets. A group of search sets may, in some cases, be referred to as a monitoring group. For example, the UE 115 may be configured with two different groups of search space sets (e.g., two monitoring groups). Alternatively, the UE 115 may be configured with any number of different groups of search space sets, such as three or more (e.g., three or more monitoring groups).

In some cases, two or more defined monitoring groups may include a number of search space sets, but there may exist additional search space sets that are not included in either of the defined monitoring groups. In such cases, a UE 115 may monitor one or more of the search space sets that are not part of the monitoring groups in addition to monitoring the particular monitoring groups (regardless of the search space sets being monitored for the respective monitoring groups). In some cases, for example when two monitoring groups are configured, the two monitoring groups may include one or more search space sets in common.

The UE 115 may be configured to switch between different monitoring groups including different search space sets. In some cases, the UE 115 may be configured to switch monitoring groups based on the occurrence of an event or upon a condition being satisfied, that is, according to an implicit indication to switch monitoring groups. For example, the UE 115 may be configured to switch monitoring groups based on detecting a downlink data burst, a reference signal (e.g., a demodulation reference signal (DMRS) or wideband DMRS), signaling in a control (e.g., in a PDCCH or in a group-common PDCCH), and/or based on information for a channel occupancy time (COT) structure. Additionally or alternatively, the UE 115 may be configured to switch monitoring groups based according to a particular signal or command, that is, according to an explicit indication to switch monitoring groups. For example, a group-common PDCCH transmission may include an explicit indication indicating that the UEs 115 of the group of UEs 115 are to switch monitoring groups (e.g., to a specified monitoring group).

In some cases, different monitoring groups may be defined to include different groups of search space sets such that the different monitoring groups have different characteristics. For example, different monitoring groups may include different groups of search space sets such that a first monitoring group has relatively shorter periodicity and a smaller number of PDCCH candidates and a second monitoring group has relatively longer periodicity and a greater number of PDCCH candidates. Accordingly, a UE 115 may be configured to switch between the first and second monitoring groups for different situations.

Figure 2:
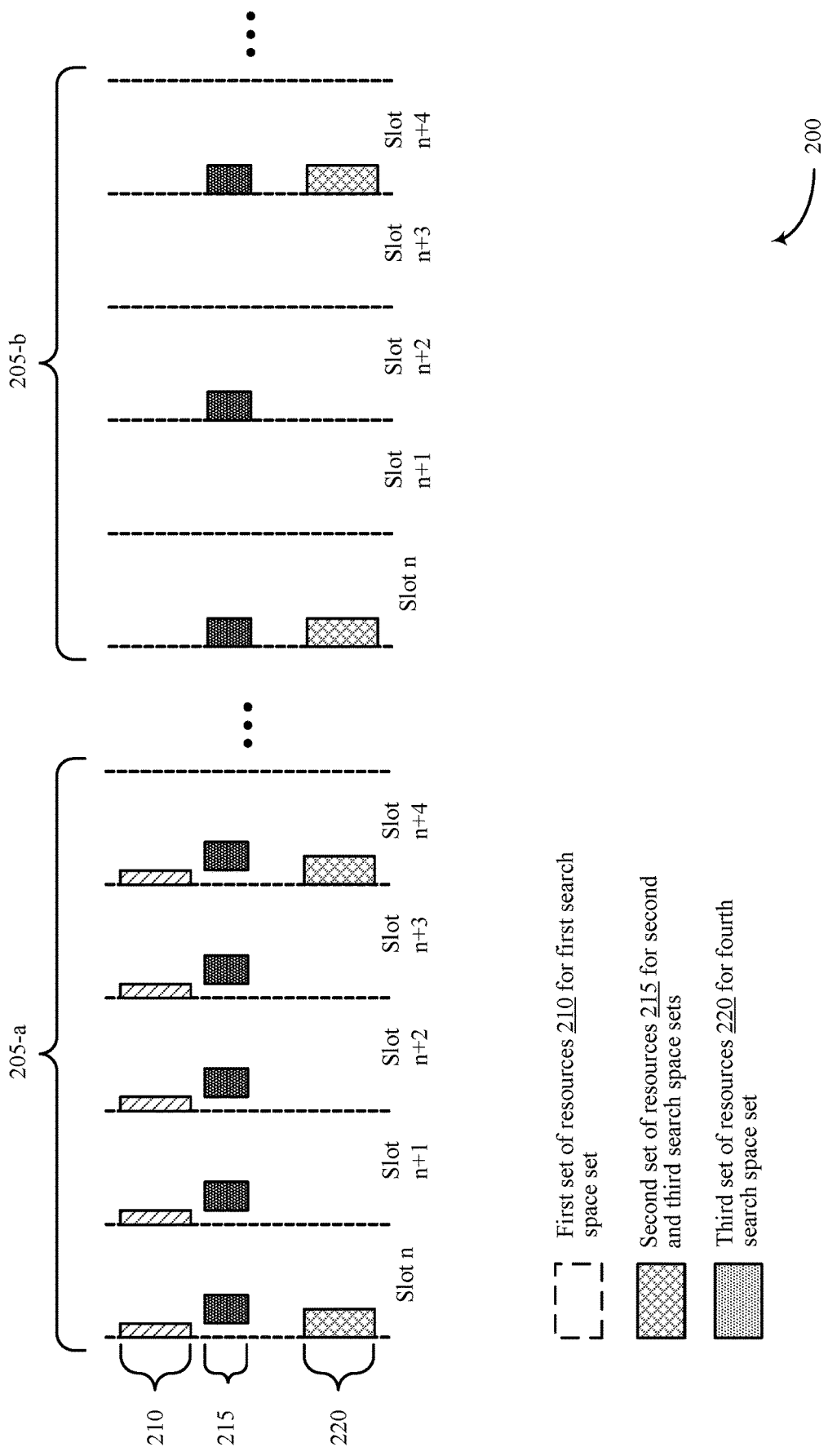
FIG. 2 illustrates an example of a monitoring timeline that support feedback techniques for group-common PDCCH transmissions in accordance with aspects of the present disclosure.

FIG. 2 illustrate an example of a monitoring timeline 200 that support feedback techniques for group-common PDCCH transmissions in accordance with aspects of the present disclosure. The monitoring timeline 200 shows an example timeline for a UE (e.g., of a group of UEs) to monitor different monitoring groups 205 including different search space sets. It is to be understood that the illustrated and example monitoring groups 205 and search space sets of FIG. 2 are only one example implementation, and different configurations may use any like combination of one or more monitoring groups 205 including different respective search space sets.

FIG. 2 shows an example including search space sets according to a first CORESET, where a UE may monitor a first set of resources 210 for a first search space set according to the first CORESET, a second CORESET, where a UE may monitor a second set of resources 215 for a second search space set and a third search space set according to the second CORESET, and a third CORESET, where a UE may monitor a third set of resources 220 for a fourth search space set according to the third CORESET. In the example of FIG. 2, according to a first monitoring group 205-a, the UE may monitor the first search space set using a periodicity of 1, the second search space set using a periodicity of 1, and the fourth search space set using a periodicity of 4. According to a second monitoring group 205-a, the UE may monitor the third search space set using a periodicity of 2, and the fourth search space set using a periodicity of 4. That is, the second and third search space sets may include the same frequency resources with different periodicities. As shown, the fourth search space set may be common between the first and second monitoring group.

As shown by the example monitoring timeline 200 of FIG. 2, in the first monitoring period 205-a, a UE may monitor relatively more sets of frequency resources with a greater periodicity than during the second monitoring period 205-b. As similarly described herein, the UE may be configured to switch between the first monitoring group 205-a and the second monitoring group 205-b for use with different situations. For example, in unlicensed band operations, the two monitoring groups 205 may be used to distinguish UE behavior within and outside of a COT. For example, before the transmission opportunity is acquired (e.g., through an LBT procedure), the UE may monitor the resources (e.g., channels) relatively more frequently to not miss the initial transmission from a base station. Once the initial transmission from the base station is detected, the UE may monitor the resources in a relatively more relaxed manner because the initial transmission may inform the UE as to the actual resources corresponding to the upcoming potential PDCCH occasions.

Figure 3:
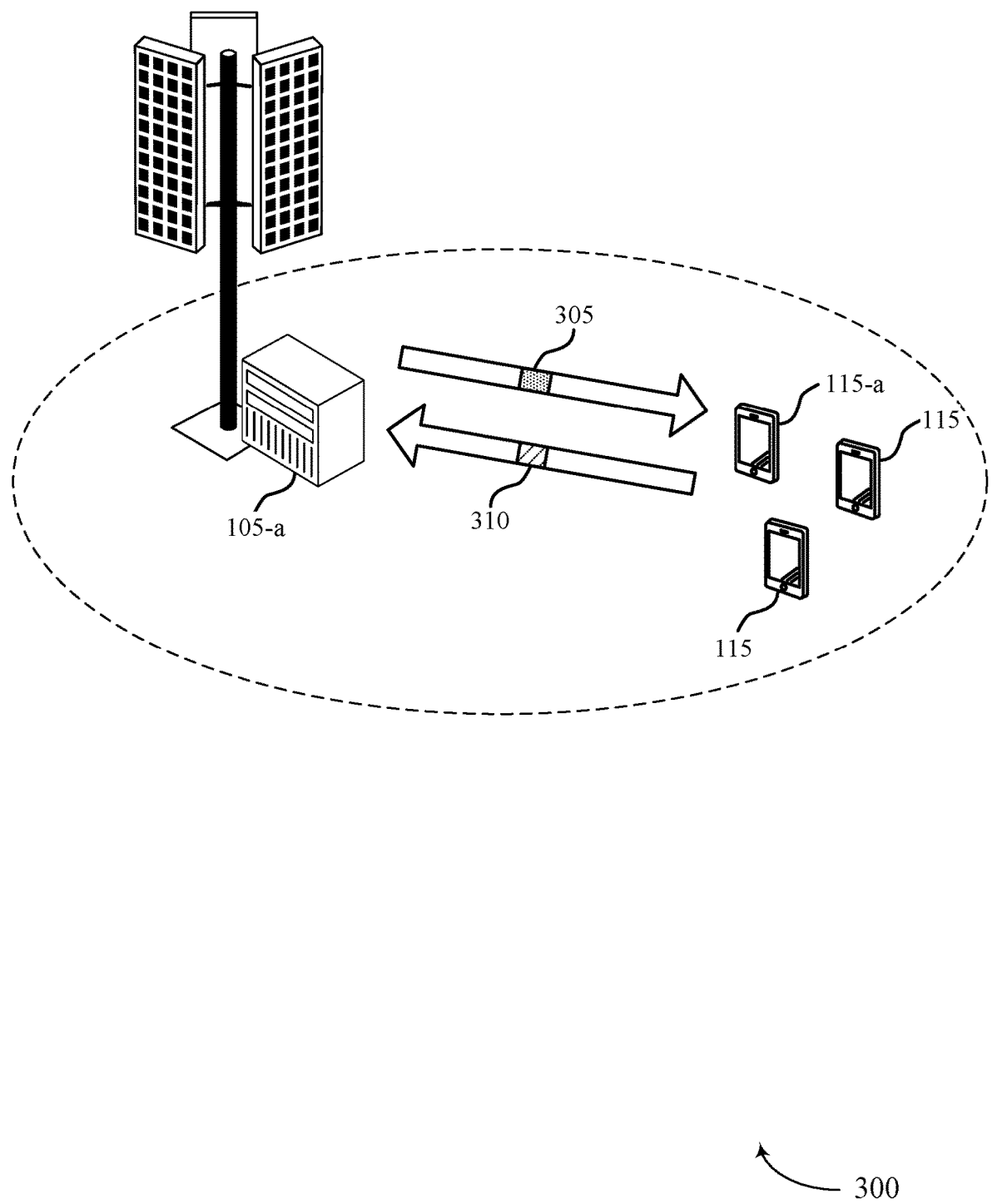
FIG. 3 illustrates an example of a wireless communications system that supports feedback techniques for group-common PDCCH transmissions in accordance with aspects of the present disclosure.

FIG. 3 illustrates an example of a wireless communications system 300 that supports feedback techniques for group-common PDCCH transmissions in accordance with aspects of the present disclosure. In some examples, the wireless communications system 300 may implement aspects of the wireless communications system 100 as described with reference to FIG. 1. The wireless communications system 300 includes a base station 105-a and a group of UEs 115 including a UE 115-a, which may be examples of the corresponding devices as described with reference to FIG. 1. The base station may transmit downlink transmissions to the UEs 115, such as a group-common PDCCH 305. Likewise, the UEs 115 may transmit uplink transmissions to the base station 105-a. For example, as described herein, the UEs 115, such as the UE 115-a, may transmit feedback information 310 to the base station 105-a.

As described herein, the base station 105-a may transmit an explicit indication to the UEs 115 to switch monitoring groups in a group-common PDCCH 305 (e.g., using a DCI format, such as DCI format 2_0). In some cases, the group-common PDCCH may be transmitted using common search space, which is monitored regardless of which monitoring group a UE 115 is using. For example, the group-common PDCCH may include a "switching flag" including a number of bits to indicate the explicit indication. If the switching flag is set to indicate a certain value, a UE 115 receiving the switching flag may switch from a first monitoring group to a second monitoring group, and otherwise the UE 115 may switch to (or continue to use) the first monitoring group (e.g., a default monitoring group).

In some cases, an inactivity timer can be configured for implicit switching. For example, a UE 115 may be configured such that the UE 115 starts the inactivity timer when the UE 115 switches, for example, from the first monitoring group to the second monitoring group. At an expiration of the timer, the UE may switch back to the first monitoring group (e.g., a default monitoring group). In some such cases, if the UE 115 receives a DCI message with the switching flag set while the UE 115 is operating using the second monitoring group, as described herein, the UE 115 may restart the inactivity timer while continuing to use the second monitoring group (extending a duration of time that the UE 115 is to use the second monitoring group, rather than immediately switching monitoring groups). However, because the base station 105-a may transmit the group-common PDCCH 305 without a scheduling grant, the UEs 115 may not be configured to respond with a feedback message (e.g., HARQ-acknowledgement (ACK) feedback).

Thus, a failure by one or more of the UEs 115 to detect the group-common PDCCH 305 may impact performance and power consumption of the UE 115, as the UE may then wait until a subsequent group-common PDCCH 305 transmission or operate without updated (e.g., using incorrect) control information. For example, if the group-common PDCCH 305 and a switch are missed, the UE 115 may monitor PDCCH using incorrect PDCCH occasions. While the inactivity timer may help the UE 115 to return to a first monitoring group in such situations, this may cause a relative latency increase due to a recovery time until the expiration of the inactivity timer. Accordingly, techniques are provided herein to improve reliability for UEs 115 to switch monitoring groups, which may accordingly provide power savings and latency improvements at the UEs 115.

According to a first technique, the base station 105-a may repeat transmission of an indication of a monitoring group (e.g., indicating a monitoring group switch). For example, the base station 105-a may transmit to the UE 115-a, in a first group-common PDCCH 305, an indication to switch from a first monitoring group to a second monitoring group. Using a configured periodicity, the base station 105-a may then transmit one or more subsequent repetitions of the first group-common PDCCH 305 including duplicate indications for the monitoring group switch. In some cases, the periodicity may be configured to be shorter (e.g., by multiples) than a duration of an inactivity timer. In some cases, the base station 105-a may transmit repetitions of the first group-common PDCCH 305 during multiple PDCCH occasions, for example, until a further switch is indicated in a subsequent group-common PDCCH 305. Accordingly, if the UE 115-a misses a first transmission of the group-common PDCCH 305, the UE 115-a may receive one or more of the repetitions and switch to the proper monitoring group accordingly. According to this technique, the repetitions may increase an amount of network overhead that is used.

According to a second technique, the UEs may use feedback information 310, such as negative acknowledgement (NACK) feedback, to indicate incorrect or missed reception of a group-common PDCCH 305 to the base station 105-a. For example, when the UE 115-a does not detect the group-common PDCCH 305 at a configured PDCCH occasion, the UE 115-a may transmit feedback information 310 to the base station 105-a. In some cases, the uplink resources used for transmitting the feedback information 310 may be common for each of the UEs 115 of group of UEs 115. Accordingly, if more than one UE 115 transmits feedback information 310, each transmission may be combined over the air. As such, if at least one UE 115 does not detect the group-common PDCCH 305, the base station 105-a may receive the feedback information 310. Based on receiving the feedback information 310, the base station 105-a may retransmit the group-common PDCCH, for example, in one or more subsequent PDCCH occasions (e.g., the next PDCCH occasion)

In some cases, however, group-common PDCCH 305 transmission may be opportunistic—that is, the base station 105-a may not transmit a group-common PDCCH 305 on every occasion (e.g., for discontinuous transmission (DTX)). Accordingly, according to this technique, some UEs 115 may not distinguish between DTX (e.g., skipping an occasion intentionally) and misdetection at the UE 115. Accordingly, the UE may transmit the feedback information 310 when the group-common PDCCH 305 is not transmitted, which may consume additional power at the UE 115 and use increased over-the-air resources.

According to a third technique, the base station 105-a may transmit an indication to the UEs 115 that indicate to the UEs 115 to determine whether the UEs 115 have correctly received a group-common PDCCH 305, based on which the UEs 115 may reply with feedback information 310 (e.g., a NACK) if the respective UEs did not receive the corresponding group-common PDCCH 305. For example, the base station may transmit a group-common PDCCH 305 to the UEs 115 including a pre-notification indication or a post-confirmation message.

A pre-notification indication may indicate to the receiving UEs 115 that one or more upcoming PDDCH occasions are to include group-common PDCCH 305 transmissions. For example, the pre-notification indication may indicate that the next PDCCH occasion will include a group-common PDCCH 305. Based on the pre-notification indication, the UEs 115 may monitor the resources (e.g., time, frequency, and spatial resources) of the next PDCCH occasion to receive the group-common PDCCH 305 transmission from the base station 105-a. If, for example, the UE 115-a does not receive the group-common PDCCH 305 during the indicated PDCCH occasion, the UE 115-a may transmit feedback information 310 to the base station 105-a indicating that the UE 115-a did not correctly receive the group-common PDCCH 305. Accordingly, the base station 105-a may retransmit the group-common PDCCH 305, as similarly described herein. In some cases, in combination with the pre-notification indication, or as a separate indication in another PDCCH transmission, the base station 105-a may indicate a set of uplink resources to be used by the UE 115-a to transmit the feedback information 310, and the UE 115-a may accordingly transmit the feedback information 310 to the base station 105-a using the indicated resources.

A post-confirmation indication may indicate to the receiving UEs 115 that one or more previous PDDCH occasions included group-common PDCCH 305 transmissions. For example, the post-confirmation indication may indicate that the previous PDCCH occasion included a group-common PDCCH 305. The UEs 115 may have been monitoring during the previous PDCCH occasion, for example, according to a previous monitoring group. Based on the post-confirmation indication, if the UE 115-a determines that it did not receive the group-common PDCCH 305 during the indicated PDCCH occasion, the UE 115-a may transmit feedback information 310 to the base station indicating that the UE 115-a did not correctly receive the group-common PDCCH 305 in the previous occasion (or occasions). Accordingly, the base station 105-a may retransmit the group-common PDCCH 305, as similarly described herein.

In some cases, pre-notification indications and post-confirmation indications may be transmitted on the PDCCH using certain formats and may be transmitted in control signaling using the same resources, for example, over the same common search space set, as the group-common PDCCH 305. In some cases, pre-notification indications and post-confirmation indications may be transmitted using configured DCI formats (e.g., using the same DCI format as each other, or using different DCI formats). In some cases, a pre-notification and/or post-confirmation indication may be indicated via a single bit indication, or a waveform-based notification, without an additional payload. Thus, a probability of successfully detecting the indication may be relatively high (e.g., as compared to a transmission including a larger number of bits). In this way, pre-notification indications and post-confirmation indications may enable UEs 115 to provide feedback information 310 (e.g., NACKs) to the base station 105-a to retransmit missed control information (e.g., a missed indication of a monitoring group switch) while efficiently utilizing transmission resources to do so.

In some cases, the different techniques, and aspects of the different techniques may be combined. For example, the base station 105-a may transmit a signal to the UE 115-a including both a pre-notification indication and a post-confirmation indication (e.g., using different DCI formats), and the UE 115-a may perform the above operations accordingly for both of the pre-notification indication and the post-confirmation indication. Additionally or alternatively, the pre-notification indication and the post-confirmation indication may be combined with repetition and other aspects of the described techniques for providing feedback information 310 to achieve different combinations of, for example, reliability versus efficiency.

Figure 4:
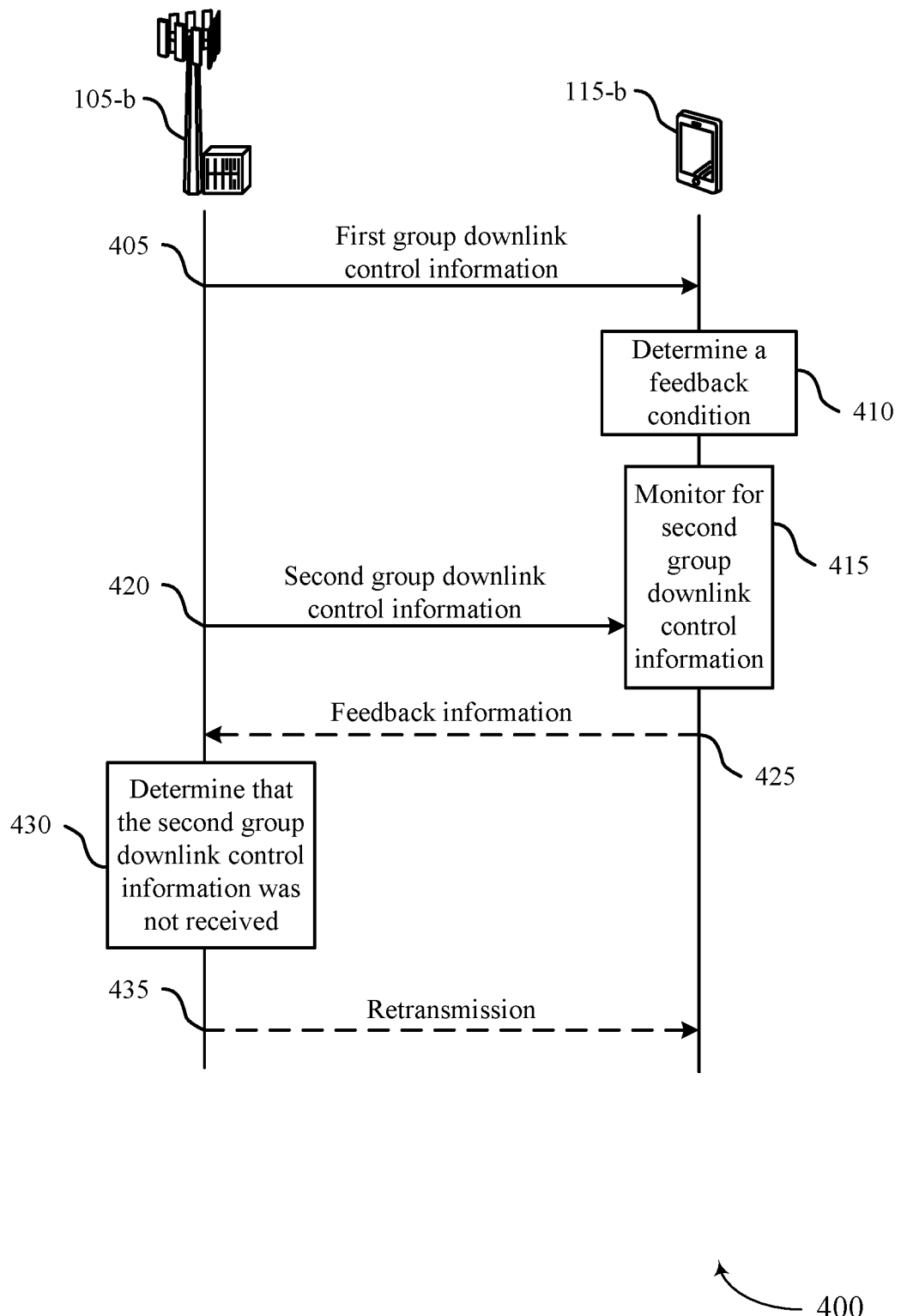
FIGS. 4 and 5 illustrate examples of process flows that supports feedback techniques for group-common PDCCH transmissions in accordance with aspects of the present disclosure.

FIG. 4 illustrates an example of a process flow 400 that supports feedback techniques for group-common PDCCH transmissions in accordance with aspects of the present disclosure. In some examples, the process flow 400 may be implemented by aspects of the wireless communications systems 100 and 300, as described with reference to FIGS. 1 and 3, respectively. The process flow 400 may include a base station 105-b and a UE 115-b, which may be examples of the corresponding devices described with reference to FIGS. 1 through 3. The process flow 400 shows example transmissions and procedures including the use of a pre-notification indication, as described herein. Alternative examples of the following may be implemented, where some steps are performed in a different order than described or are not performed at all. In some cases, steps may include additional features not mentioned below, or further steps may be added.

At 405, the base station 105-b may transmit to the UE 115-b, and the UE 115-b may receive from the base station 105-b, a first group downlink control information transmission (e.g., a group-common PDCCH transmission). For example, the UE 115-b may receive the first group downlink control information transmission associated with a UE group (e.g., a group of UEs including the UE 115-b), where the first group downlink control information transmission references a second group downlink control information transmission (e.g., via a pre-notification indication).

In some cases, the UE 115-b may monitor a first search space set for the first group downlink control information transmission. In some cases, the first group downlink control information transmission may include a monitoring group indication, for example, indicating a second monitoring group for monitoring. Accordingly, in some cases, the UE 115-*b* may switch to monitoring the second search space set based at least in part on the monitoring group indication. In some cases, the first group downlink control information transmission may additionally reference a previous group downlink control information transmission (e.g., via a post-confirmation indication).

At 410, the UE 115-*b* may determine a feedback condition for the second group downlink control information transmission based at least in part on the first group downlink control information transmission (e.g., according to the pre-notification indication). For example, the UE 115-*b* may determine to transmit feedback information to the base station 105-*b* if the UE 115-*b* determines that it does not successfully receive a second group downlink control information transmission according to the pre-notification indication. In some cases, the UE 115-*b* may determine a feedback condition for the previous group downlink control information transmission based at least in part on the first group downlink control information transmission (e.g., according to the post-confirmation indication, as similarly described herein with reference to FIGS. 3 and 5).

At 415, the UE 115-*b* may monitor for a second group downlink control information transmission, for example, based at least in part on the first group downlink control information transmission (e.g., according to the pre-notification indication). For example, the UE 115-*b* may monitor the second search space set for the second group downlink control information transmission, according to the monitoring group indication that may have been received in the first group downlink control information transmission.

At 420, the base station 105-*b* may transmit to the UE 115-*b*, and the UE 115-*b* may receive from the base station 105-*b*, a second group downlink control information transmission. In some cases, the second downlink control information transmission may include a monitoring group indication, for example, indicating a second monitoring group for monitoring, as similarly described for the first group downlink control information at 405. In some cases, the first group downlink control information transmission may use a different downlink control information format than the second group downlink control information transmission. In some cases, the second group downlink control information transmission may be in an immediately subsequent control channel opportunity (e.g., PDCCH opportunity) to the first group downlink control information transmission.

At 425, the UE 115-*b* may transmit to the base station 105-*b*, and the base station 105-*b* may receive from the UE 115-*b*, feedback information (e.g., a NACK) for the second group downlink control information transmission, for example, based on monitoring for the second group downlink control information transmission at 420 and the feedback condition, as may have been determined at 410.

Based on monitoring for the second group downlink control information transmission at 415, the UE 115-*b* may determine that the UE 115-*b* did not receive (or did not correctly receive) the second group downlink control information. If, for example, the UE 115-*b* determines that it did not receive the second group downlink control information transmission, the UE 115-*b* may transmit feedback information to the base station 105-*b* including a NACK, which may indicate to the base station 105-*b* that the UE did not receive the second group downlink control information transmission.

At 430, the base station 105-*b* may determine that the second group downlink control information was not received (or was not correctly received, e.g., due to interference) at the UE 115-*b*. For example, the base station 105-*b* may determine that the second group downlink control information was not received based on the feedback information that may have been communicated between the UE 115-*b* and the base station 105-*b* at 425.

At 435, the base station 105-*b* may transmit to the UE 115-*b*, and the UE 115-*b* may receive from the base station 105-*b*, a retransmission of at least a portion of the second group downlink control information, for example, based on the feedback information as may have been communicated at 425. The retransmission may include a full retransmission of the information included in the second group downlink control information. Alternatively, the retransmission may include portion of the information included in the second group downlink control information (e.g., particular information included in the second group downlink control information that the UE 115-*b* indicated as not correctly received in the NACK at 425). In some cases, the retransmission at 435 may reference an additional group downlink control information transmission, for example, via a further pre-notification indication and/or post-confirmation indication, as described herein.

Figure 5:
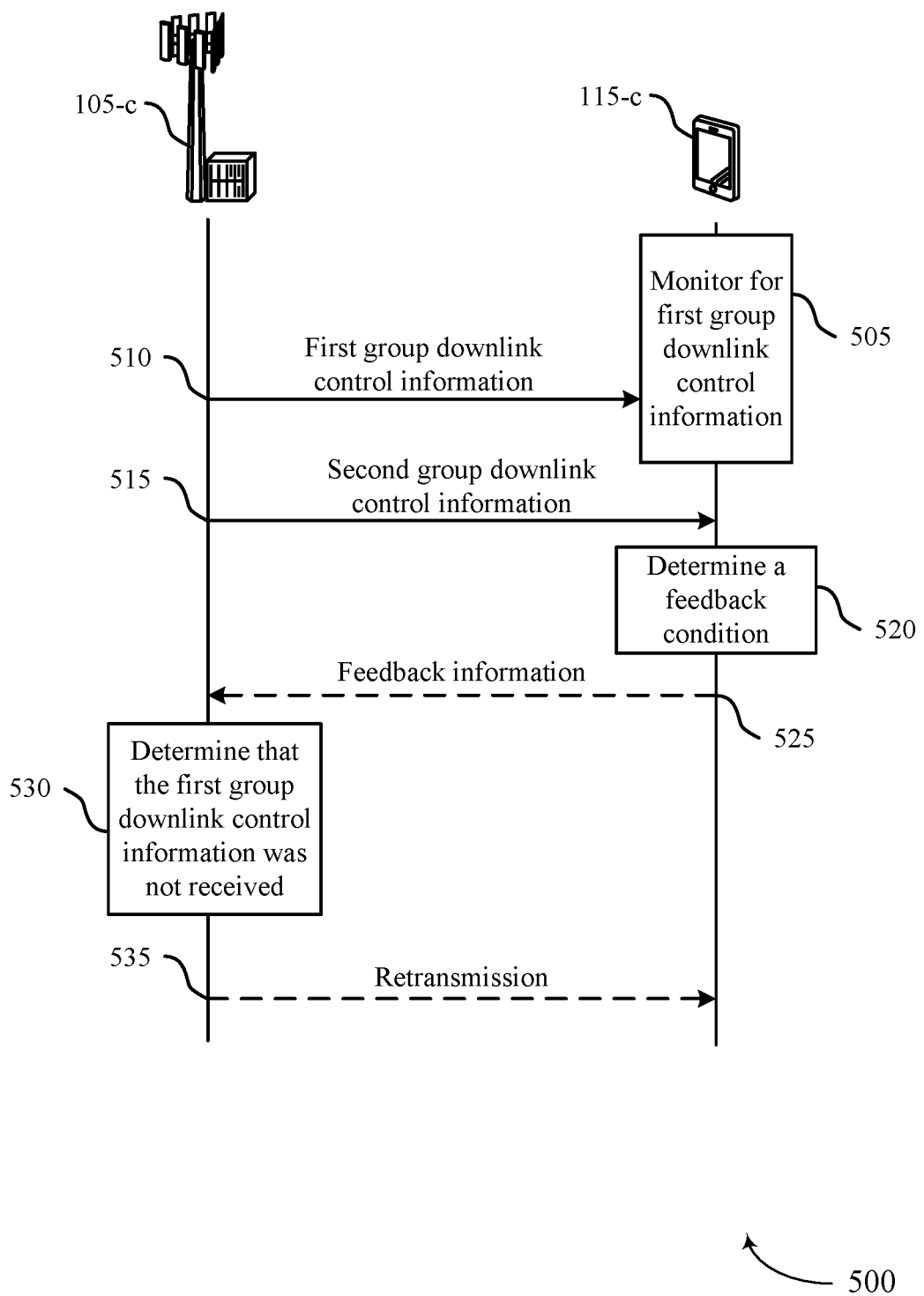

FIG. 5 illustrates an example of a process flow 500 that supports feedback techniques for group-common PDCCH transmissions in accordance with aspects of the present disclosure. In some examples, the process flow 500 may be implemented by aspects of the wireless communications systems 100 and 300, as described with reference to FIGS. 1 and 3, respectively. The process flow 500 may include a base station 105-*c* and a UE 115-*c*, which may be examples of the corresponding devices described with reference to FIGS. 1 through 3. The process flow 500 shows example transmissions and procedures including the use of a post-confirmation indication, as described herein. Alternative examples of the following may be implemented, where some steps are performed in a different order than described or are not performed at all. In some cases, steps may include additional features not mentioned below, or further steps may be added.

At 505, the UE 115-*c* may monitor for a first group downlink control information transmission. In some cases, the UE 115-*c* may monitor a first search space set for the first group downlink control information transmission (e.g., according to a first monitoring group).

At 510, the base station 105-*c* may transmit to the UE 115-*c*, and the UE 115-*c* may receive from the base station 105-*c*, a first group downlink control information transmission (e.g., a group-common PDCCH transmission).

At 515, the base station 105-*c* may transmit to the UE 115-*c*, and the UE 115-*c* may receive from the base station 105-*c*, a second group downlink control information transmission (e.g., a group-common PDCCH transmission). For example, the UE 115-*c* may receive the second group downlink control information transmission associated with a UE group (e.g., a group of UEs including the UE 115-*c*), where the second group downlink control information transmission references the first group downlink control information transmission (e.g., via a post-confirmation indication).

In some cases, the first group downlink control information transmission may use a different downlink control information format than the second group downlink control information transmission. In some cases, the first group downlink control information transmission may be in a control channel opportunity (e.g., PDCCH opportunity) immediately preceding the second group downlink control information transmission.

In some cases, the UE 115-c may monitor the first search space set for the second group downlink control information transmission. In some cases, the first group downlink control information transmission and/or the second downlink control information transmission may include a monitoring group indication, for example, indicating a second monitoring group for monitoring. Accordingly, in some cases, the UE 115-c may switch to monitoring the second search space set based at least in part on the monitoring group indication. In some cases, the second group downlink control information transmission may additionally reference a third group downlink control information transmission (e.g., via a pre-notification indication). For example, the third group downlink control information transmission may follow the second group downlink control information transmission (e.g., in a subsequent control channel opportunity).

At 520, the UE 115-c may determine a feedback condition for the first group downlink control information transmission based at least in part on the second group downlink control information transmission (e.g., according to the post-confirmation indication). For example, the UE 115-c may determine to transmit feedback information to the base station 105-c if the UE 115-c determines that it did not successfully receive the first group downlink control information transmission (e.g., at 510) according to the post-confirmation indication. In some cases, the UE 115-c may determine a feedback condition for the third group downlink control information transmission based at least in part on the second group downlink control information transmission (e.g., according to the pre-notification indication, as similarly described herein with reference to FIGS. 3 and 4).

At 525, the UE 115-c may transmit to the base station 105-c, and the base station 105-c may receive from the UE 115-c, feedback information (e.g., a NACK) for the first group downlink control information transmission, for example, based on monitoring for the first group downlink control information transmission at 505 and the feedback condition, as may have been determined at 520.

Based on monitoring for the first group downlink control information transmission at 505, the UE 115-c may determine that the UE 115-c did not receive (or did not correctly receive) the first group downlink control information. If, for example, the UE 115-c determines that it did not receive the first group downlink control information transmission, the UE 115-c may transmit feedback information to the base station 105-c including a NACK, which may indicate to the base station 105-c that the UE did not receive the first group downlink control information transmission.

At 530, the base station 105-c may determine that the first group downlink control information transmission was not received (or was not correctly received, e.g., due to interference) at the UE 115-c. For example, the base station 105-c may determine that the first group downlink control information transmission was not received based on the feedback information that may have been communicated between the UE 115-c and the base station 105-c at 525.

At 535, the base station 105-c may transmit to the UE 115-c, and the UE 115-c may receive from the base station 105-c, a retransmission of at least a portion of the first group downlink control information, for example, based on the feedback information as may have been communicated at 525. The retransmission may include a full retransmission of the information included in the first group downlink control information transmission. Alternatively, the retransmission may include portion of the information included in the first group downlink control information transmission (e.g., particular information included in the first group downlink control information transmission that the UE 115-c indicated as not correctly received in the NACK at 525). In some cases, the retransmission at 535 may reference an additional group downlink control information transmission, for example, via a further pre-notification indication and/or post-confirmation indication, as described herein.

Figure 6:
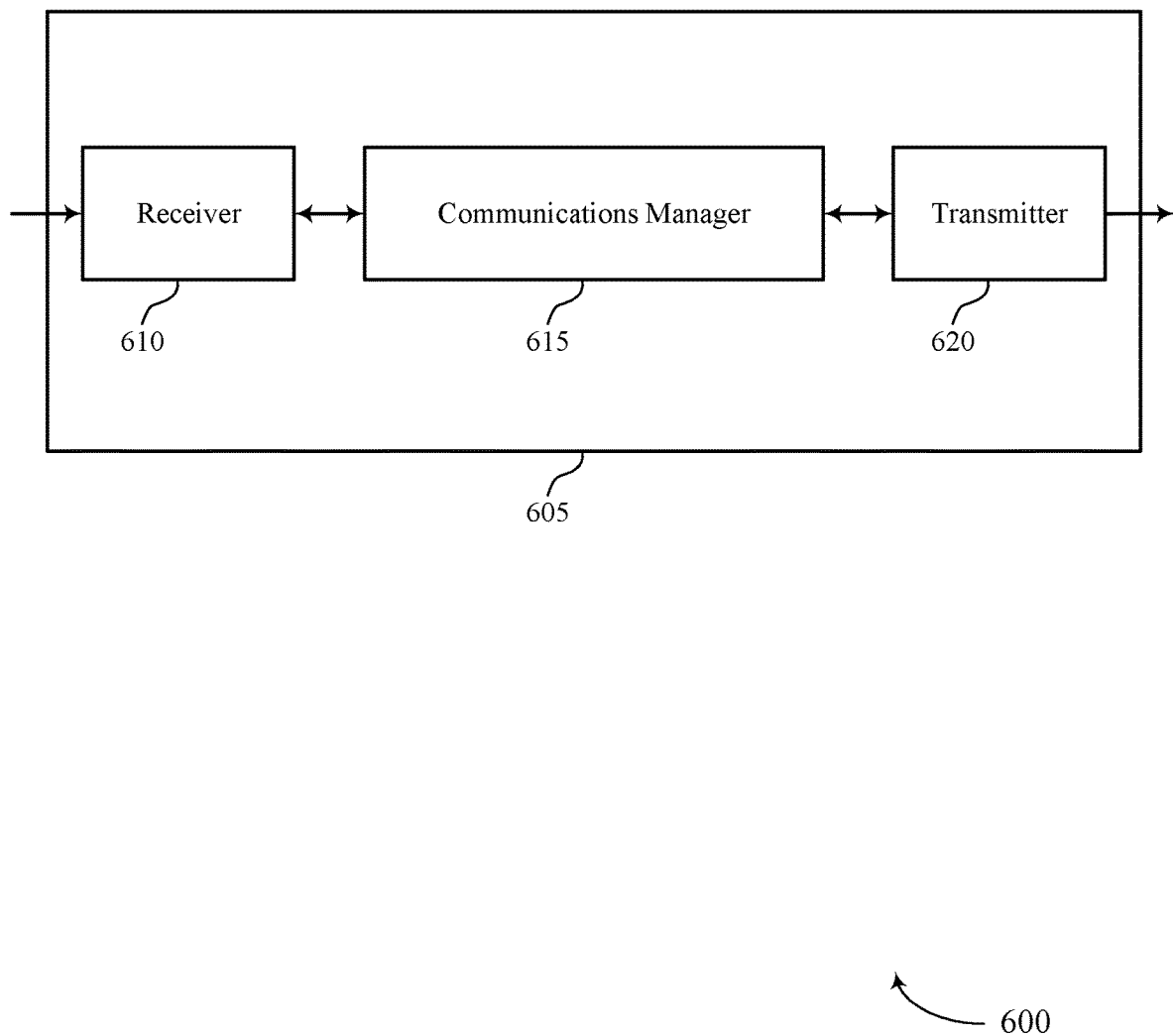
FIGS. 6 and 7 show block diagrams of devices that support feedback techniques for group-common PDCCH transmissions in accordance with aspects of the present disclosure.

FIG. 6 shows a block diagram 600 of a device 605 that supports feedback techniques for group-common PDCCH transmissions in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to feedback techniques for group-common PDCCH transmissions, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a first group downlink control information transmission associated with a UE group, the first group downlink control information transmission referencing a second group downlink control information transmission, determine a feedback condition for the second group downlink control information transmission based on the first group downlink control information transmission, transmit feedback information for the second group downlink control information transmission based on the monitoring and the determined feedback condition, and monitor for the second group downlink control information transmission based on the first group downlink control information transmission. The communications manager 615 may also monitor for a first group downlink control information transmission associated with a UE group, receive a second group downlink control information transmission referencing the first group downlink control information transmission, determine a feedback condition for the first group downlink control information transmission based on the second group downlink control information transmission, and transmit feedback information for the first group downlink control information transmission based on the monitoring and the determined feedback condition. The communications manager 615 may be an example of aspects of the communications manager 910 described herein.

These features of the communications manager may realize a number of advantages to the device 605. These advantages may include, for example, an increased robustness of group downlink control information through enhanced feedback mechanisms. This increased robustness may allow the device 605 to quickly and more efficiently receive group downlink control information signaling a search space group, resulting in a quicker transition from more frequent search space monitoring to less-frequent search space monitoring. This faster transition to a more power-efficient state may in turn improve battery life, reduce power consumption, and reduce signaling overhead.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
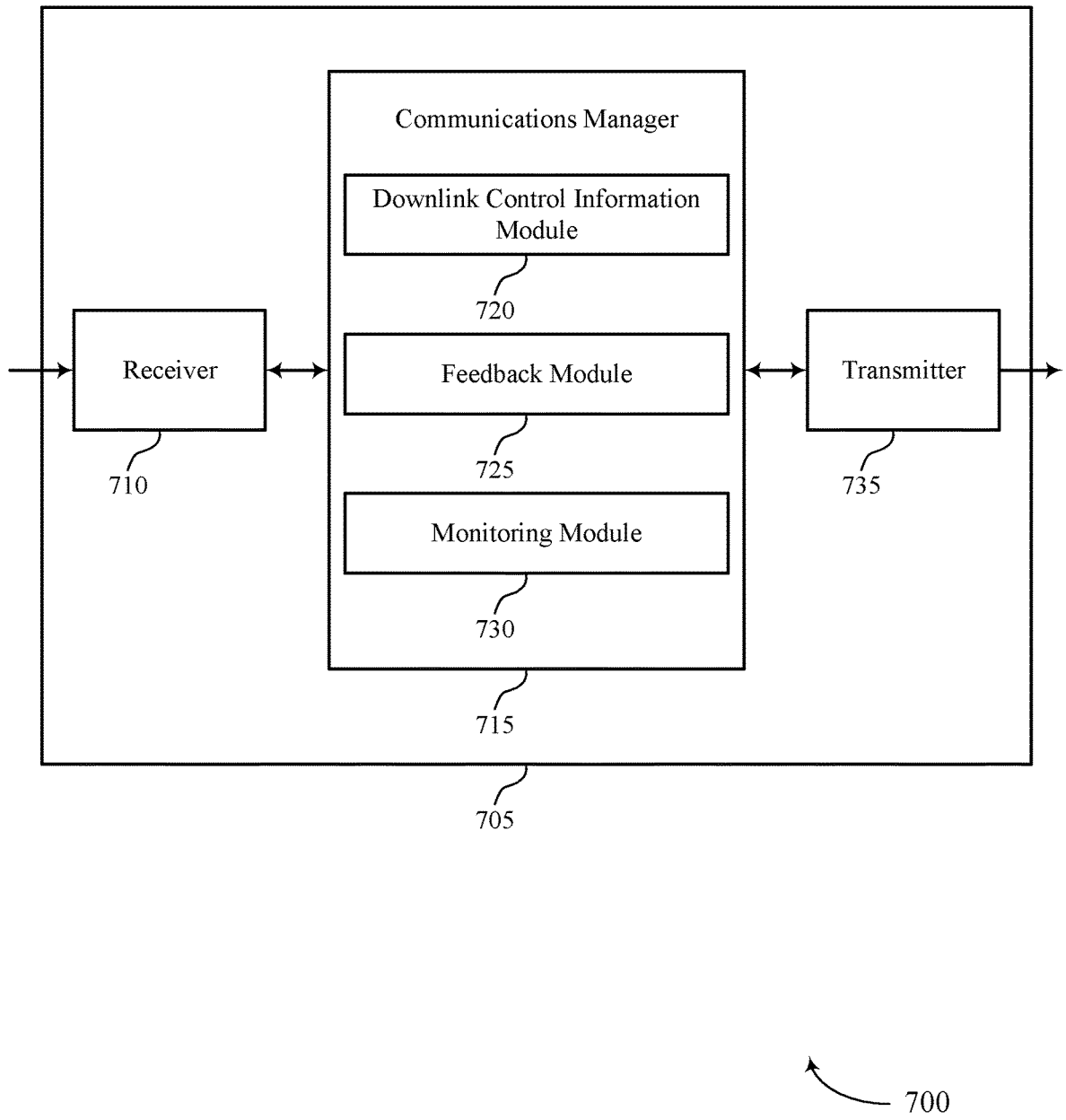

FIG. 7 shows a block diagram 700 of a device 705 that supports feedback techniques for group-common PDCCH transmissions in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to feedback techniques for group-common PDCCH transmissions, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a downlink control information module 720, a feedback module 725, and a monitoring module 730. The communications manager 715 may be an example of aspects of the communications manager 910 described herein.

The downlink control information module 720 may receive a first group downlink control information transmission associated with a UE group, the first group downlink control information transmission referencing a second group downlink control information transmission.

The feedback module 725 may determine a feedback condition for the second group downlink control information transmission based on the first group downlink control information transmission and transmit feedback information for the second group downlink control information transmission based on the monitoring and the determined feedback condition.

The monitoring module 730 may monitor for the second group downlink control information transmission based on the first group downlink control information transmission.

The monitoring module 730 may monitor for a first group downlink control information transmission associated with a UE group.

The downlink control information module 720 may receive a second group downlink control information transmission referencing the first group downlink control information transmission.

The feedback module 725 may determine a feedback condition for the first group downlink control information transmission based on the second group downlink control information transmission and transmit feedback information for the first group downlink control information transmission based on the monitoring and the determined feedback condition.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
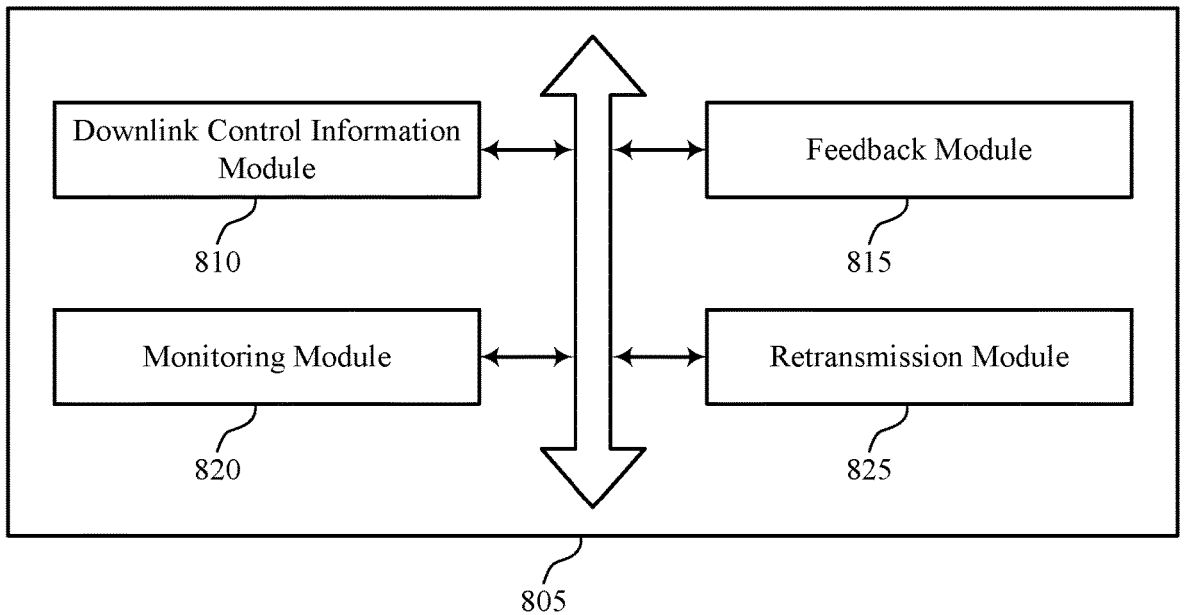
FIG. 8 shows a block diagram of a communications manager that supports feedback techniques for group-common PDCCH transmissions in accordance with aspects of the present disclosure.

FIG. 8 shows a block diagram 800 of a communications manager 805 that supports feedback techniques for group-common PDCCH transmissions in accordance with aspects of the present disclosure. The communications manager 805 may be an example of aspects of a communications manager 615, a communications manager 715, or a communications manager 910 described herein. The communications manager 805 may include a downlink control information module 810, a feedback module 815, a monitoring module 820, and a retransmission module 825. Each of these modules may communicate, directly or indirectly, with one another (e.g., via one or more buses).

The downlink control information module 810 may receive a first group downlink control information transmission associated with a UE group, the first group downlink control information transmission referencing a second group downlink control information transmission.

In some examples, the downlink control information module 810 may receive a second group downlink control information transmission referencing the first group downlink control information transmission.

In some examples, the downlink control information module 810 may monitor a first search space set for the first group downlink control information transmission.

In some examples, the downlink control information module 810 may monitor a first search space set for the second group downlink control information transmission.

In some cases, the first group downlink control information transmission includes a monitoring group indication.

In some cases, the first group downlink control information transmission includes a different downlink control information format than the second group downlink control information transmission.

In some cases, the first group downlink control information transmission references the second group downlink control information transmission using a pre-notification indication.

In some cases, the pre-notification indication includes a single bit indication.

In some cases, the first group downlink control information transmission may indicate a set of resources for transmitting the feedback information.

In some cases, the second group downlink control information transmission is in an immediately subsequent control channel opportunity to the first group downlink control information transmission.

In some cases, the second downlink control information transmission includes a monitoring group indication.

In some cases, the first group downlink control information transmission includes a different downlink control information format than the second group downlink control information transmission.

In some cases, the second group downlink control information transmission references the first group downlink control information transmission using a post-confirmation indication.

In some cases, the post-confirmation indication includes a single bit indication.

In some cases, the second group downlink control information transmission may indicate a set of resources for transmitting the feedback information.

In some cases, the first group downlink control information transmission is in a control channel opportunity immediately preceding the second group downlink control information transmission.

The feedback module 815 may determine a feedback condition for the second group downlink control information transmission based on the first group downlink control information transmission.

In some examples, the feedback module 815 may transmit feedback information for the second group downlink control information transmission based on the monitoring and the determined feedback condition.

In some examples, the feedback module 815 may determine a feedback condition for the first group downlink control information transmission based on the second group downlink control information transmission.

In some examples, the feedback module 815 may transmit feedback information for the first group downlink control information transmission based on the monitoring and the determined feedback condition.

In some examples, determining, based on the monitoring, that the second group downlink control information was not received, where the feedback information includes a negative acknowledgement.

In some examples, the feedback module 815 may determine a feedback condition for the previous group downlink control information transmission based on the first group downlink control information transmission.

In some examples, determining, based on the monitoring, that the first group downlink control information transmission was not received, where the feedback information includes a negative acknowledgement.

In some examples, the feedback module 815 may determine a feedback condition for the third group downlink control information transmission based on the first group downlink control information transmission.

The monitoring module 820 may monitor for the second group downlink control information transmission based on the first group downlink control information transmission.

In some examples, the monitoring module 820 may monitor for a first group downlink control information transmission associated with a UE group.

In some examples, the monitoring module 820 may switch to a second search space set for monitoring by the UE based on the monitoring group indication.

In some examples, the monitoring module 820 may switch to a second search space set for monitoring by the UE based on the monitoring group indication.

The retransmission module 825 may receive a retransmission of at least a portion of the second group downlink control information based on transmitting the feedback information.

In some examples, the retransmission module 825 may receive a retransmission of at least a portion of the first group downlink control information transmission based on transmitting the feedback information.

Figure 9:
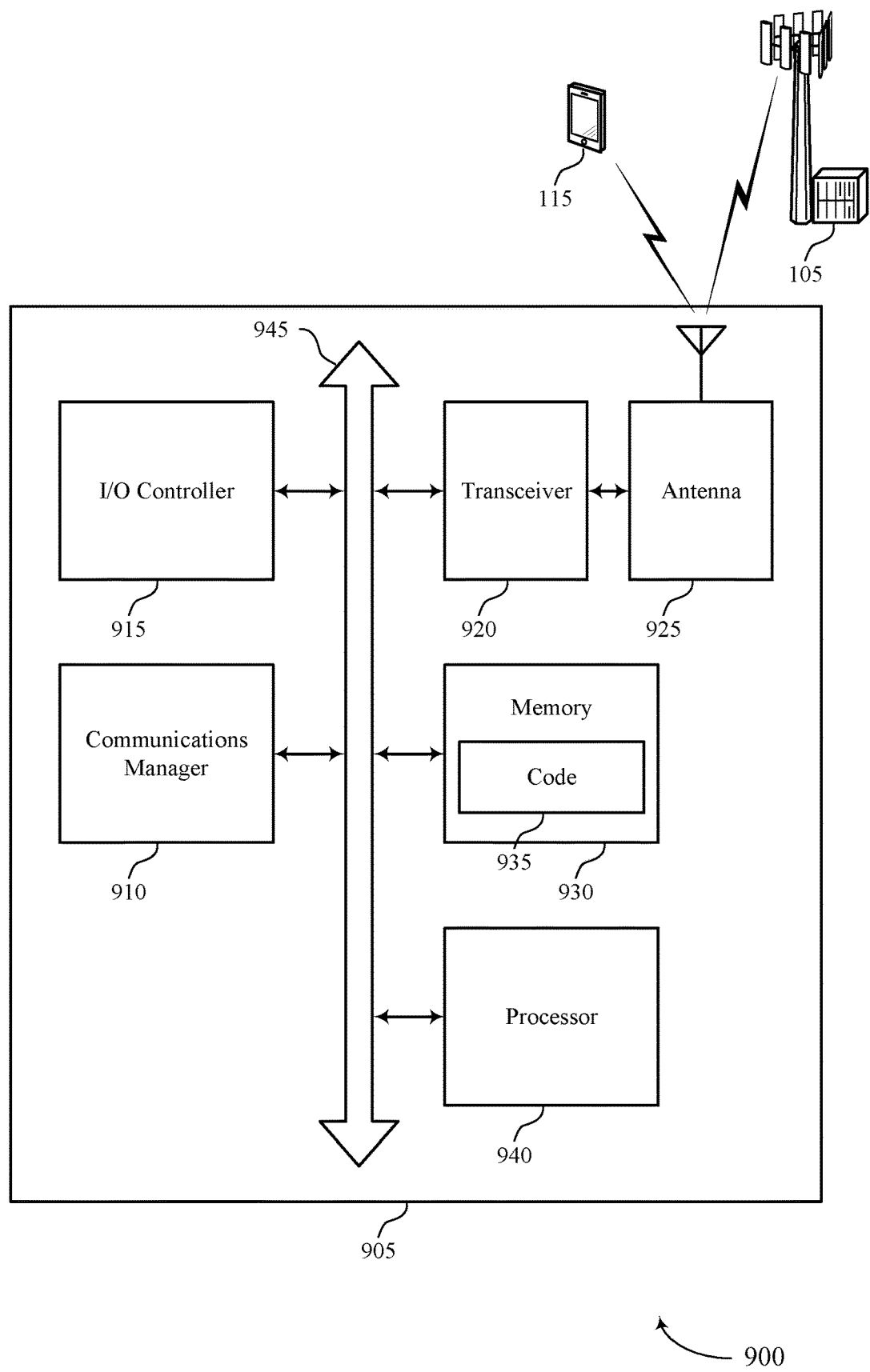
FIG. 9 shows a diagram of a system including a device that supports feedback techniques for group-common PDCCH transmissions in accordance with aspects of the present disclosure.

FIG. 9 shows a diagram of a system 900 including a device 905 that supports feedback techniques for group-common PDCCH transmissions in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a first group downlink control information transmission associated with a UE group, the first group downlink control information transmission referencing a second group downlink control information transmission, determine a feedback condition for the second group downlink control information transmission based on the first group downlink control information transmission, transmit feedback information for the second group downlink control information transmission based on the monitoring and the determined feedback condition, and monitor for the second group downlink control information transmission based on the first group downlink control information transmission. The communications manager 910 may also monitor for a first group downlink control information transmission associated with a UE group, receive a second group downlink control information transmission referencing the first group downlink control information transmission, determine a feedback condition for the first group downlink control information transmission based on the second group downlink control information transmission, and transmit feedback information for the first group downlink control information transmission based on the monitoring and the determined feedback condition.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting feedback techniques for group-common PDCCH transmissions).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
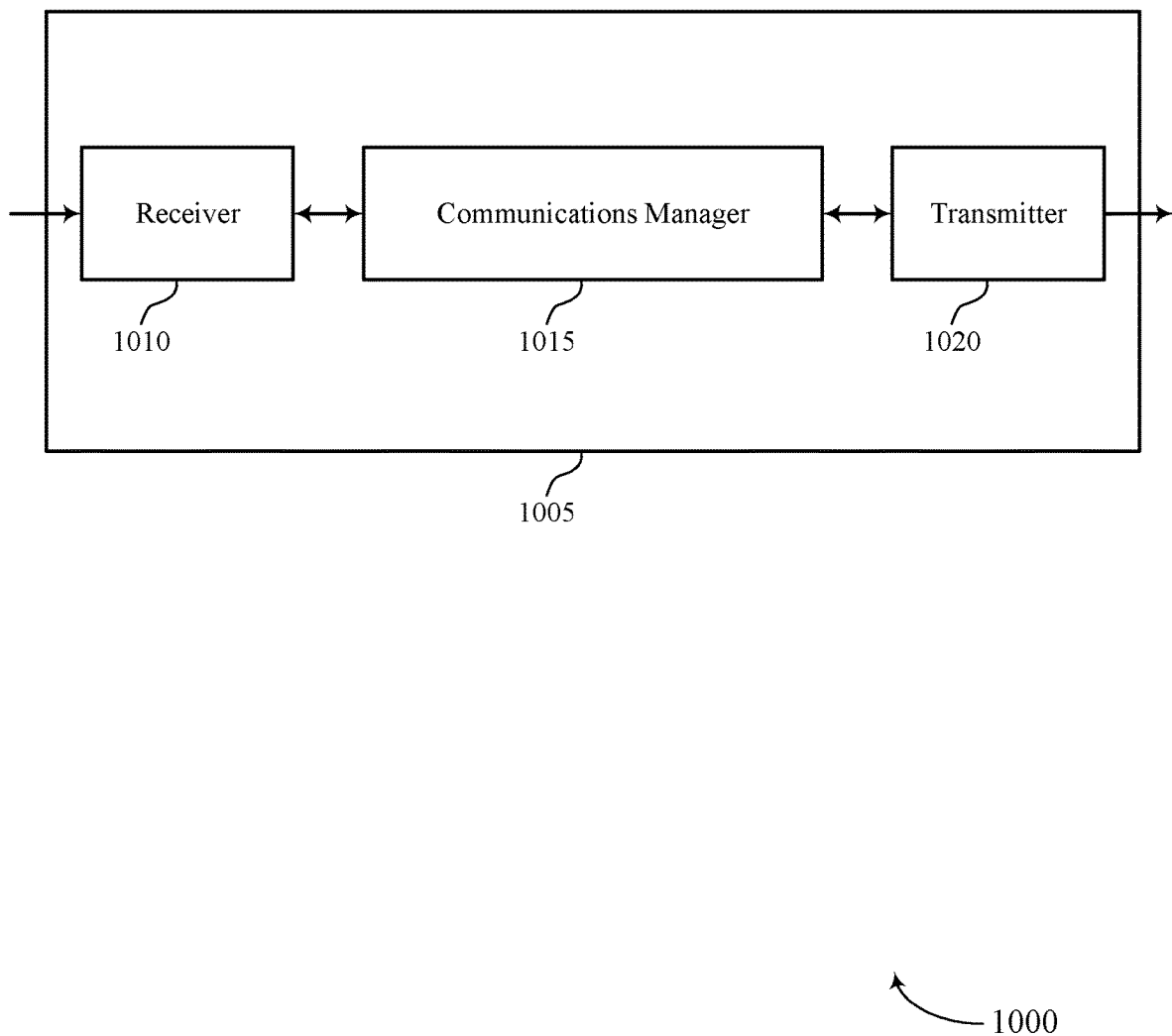
FIGS. 10 and 11 show block diagrams of devices that support feedback techniques for group-common PDCCH transmissions in accordance with aspects of the present disclosure.

FIG. 10 shows a block diagram 1000 of a device 1005 that supports feedback techniques for group-common PDCCH transmissions in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to feedback techniques for group-common PDCCH transmissions, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a first group downlink control information transmission associated with a UE group, the first group downlink control information transmission referencing a second group downlink control information transmission, transmit the second group downlink control information transmission based on the first group downlink control information transmission, and receive feedback information for the second group downlink control information transmission. The communications manager 1015 may also transmit a first group downlink control information transmission associated with a UE group, transmit the second group downlink control information transmission, the second group downlink control information transmission referencing the first group downlink control information transmission, and receive feedback information for the first group downlink control information transmission. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with aspects of the present disclosure.

These features of the communications manager 1015 may realize a number of advantages to the device 1005. These advantages may include, for example, an increased robustness of group downlink control information through enhanced feedback mechanisms. This increased robustness may allow the device 1005 to quickly and more efficiently transmit group downlink control information signaling a search space group, resulting in the freeing up of search space resources for other UEs and a reduction in signaling overhead.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
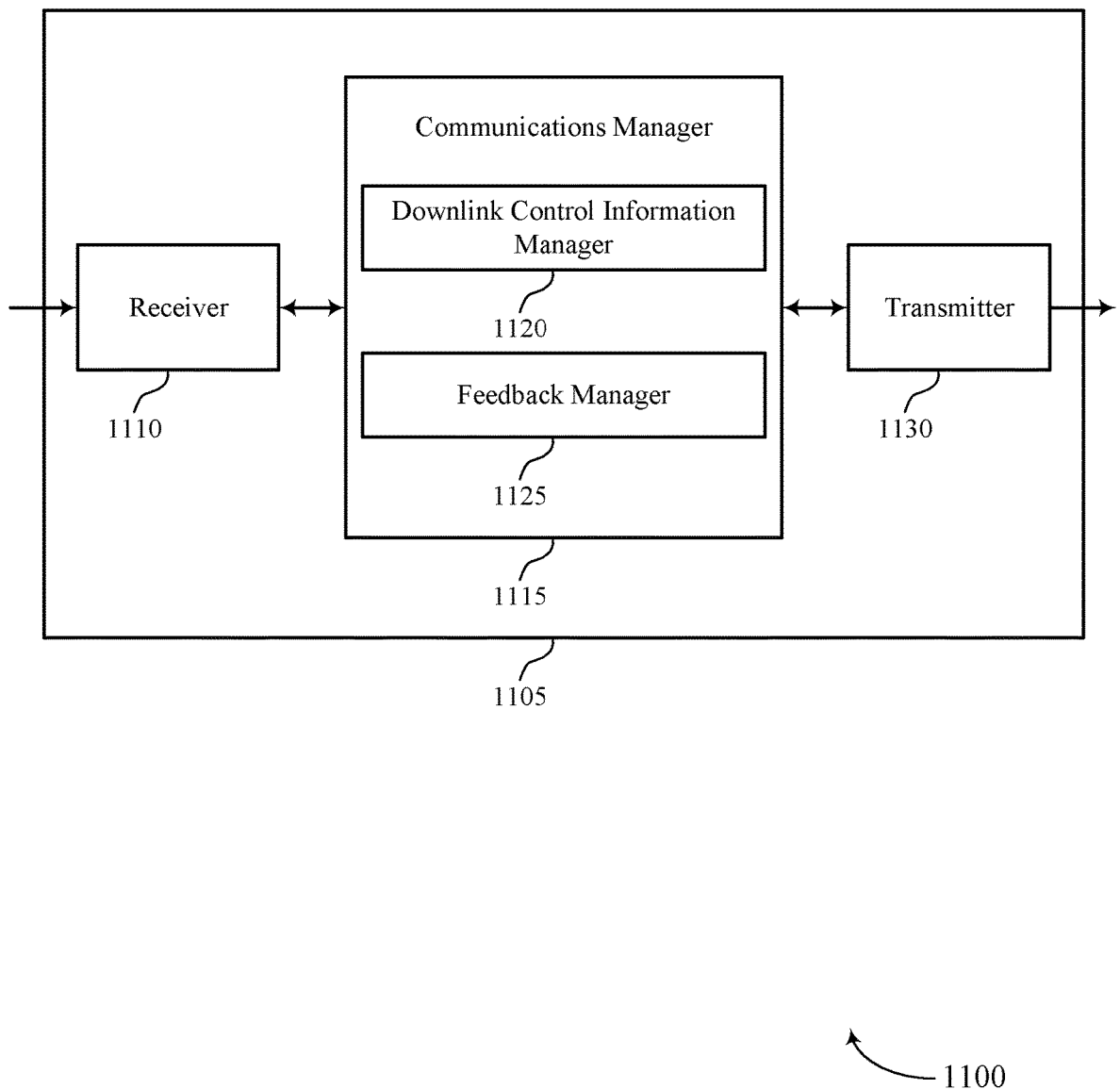

FIG. 11 shows a block diagram 1100 of a device 1105 that supports feedback techniques for group-common PDCCH transmissions in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to feedback techniques for group-common PDCCH transmissions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a downlink control information manager 1120 and a feedback manager 1125. The communications manager 1115 may be an example of aspects of the communications manager 1310 described herein.

The downlink control information manager 1120 may transmit a first group downlink control information transmission associated with a UE group, the first group downlink control information transmission referencing a second group downlink control information transmission and transmit the second group downlink control information transmission based on the first group downlink control information transmission.

The feedback manager 1125 may receive feedback information for the second group downlink control information transmission.

The downlink control information manager 1120 may transmit a first group downlink control information transmission associated with a UE group and transmit the second group downlink control information transmission, the second group downlink control information transmission referencing the first group downlink control information transmission.

The feedback manager 1125 may receive feedback information for the first group downlink control information transmission.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
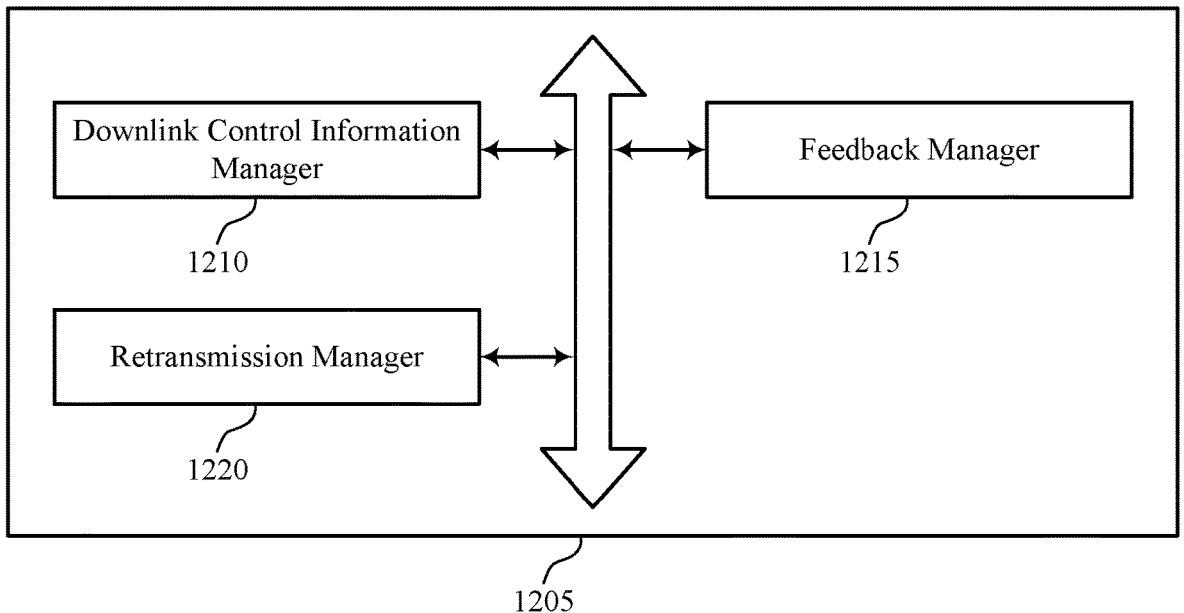
FIG. 12 shows a block diagram of a communications manager that supports feedback techniques for group-common PDCCH transmissions in accordance with aspects of the present disclosure.

FIG. 12 shows a block diagram 1200 of a communications manager 1205 that supports feedback techniques for group-common PDCCH transmissions in accordance with aspects of the present disclosure. The communications manager 1205 may be an example of aspects of a communications manager 1015, a communications manager 1115, or a communications manager 1310 described herein. The communications manager 1205 may include a downlink control information manager 1210, a feedback manager 1215, and a retransmission manager 1220. Each of these modules may communicate, directly or indirectly, with one another (e.g., via one or more buses).

The downlink control information manager 1210 may transmit a first group downlink control information transmission associated with a UE group, the first group downlink control information transmission referencing a second group downlink control information transmission.

In some examples, the downlink control information manager 1210 may transmit the second group downlink control information transmission based on the first group downlink control information transmission.

In some examples, the downlink control information manager 1210 may transmit a first group downlink control information transmission associated with a UE group.

In some examples, the downlink control information manager 1210 may transmit the second group downlink control information transmission, the second group downlink control information transmission referencing the first group downlink control information transmission.

In some cases, the first group downlink control information transmission includes a monitoring group indication.

In some cases, the first group downlink control information transmission includes a different downlink control information format than the second group downlink control information transmission.

In some cases, the first group downlink control information transmission references the second group downlink control information transmission using a pre-notification indication.

In some cases, the pre-notification indication includes a single bit indication.

In some cases, the second group downlink control information transmission is in an immediately subsequent control channel opportunity to the first group downlink control information transmission.

In some cases, the second downlink control information transmission includes a monitoring group indication.

In some cases, the first group downlink control information transmission includes a different downlink control information format than the second group downlink control information transmission.

In some cases, the first group downlink control information transmission references the second group downlink control information transmission using a post-confirmation indication.

In some cases, the post-confirmation indication includes a single bit indication.

In some cases, the first group downlink control information transmission is in a control channel opportunity immediately preceding the second group downlink control information transmission.

The feedback manager 1215 may receive feedback information for the second group downlink control information transmission.

In some examples, the feedback manager 1215 may receive feedback information for the first group downlink control information transmission.

In some examples, determining, based on receiving the feedback information, that the second group downlink control information was not received at the UE, where the feedback information includes a negative acknowledgement.

In some examples, the feedback manager 1215 may receive feedback information for the previous group downlink control information transmission.

In some examples, determining, based on receiving the feedback information, that the first group downlink control information transmission was not received at the UE, where the feedback information includes a negative acknowledgement.

In some examples, the feedback manager 1215 may receive feedback information for the third group downlink control information transmission.

The retransmission manager 1220 may transmit a retransmission of at least a portion of the second group downlink control information based on transmitting the feedback information.

In some examples, the retransmission manager 1220 may retransmit at least a portion of the first group downlink control information transmission based on transmitting the feedback information.

Figure 13:
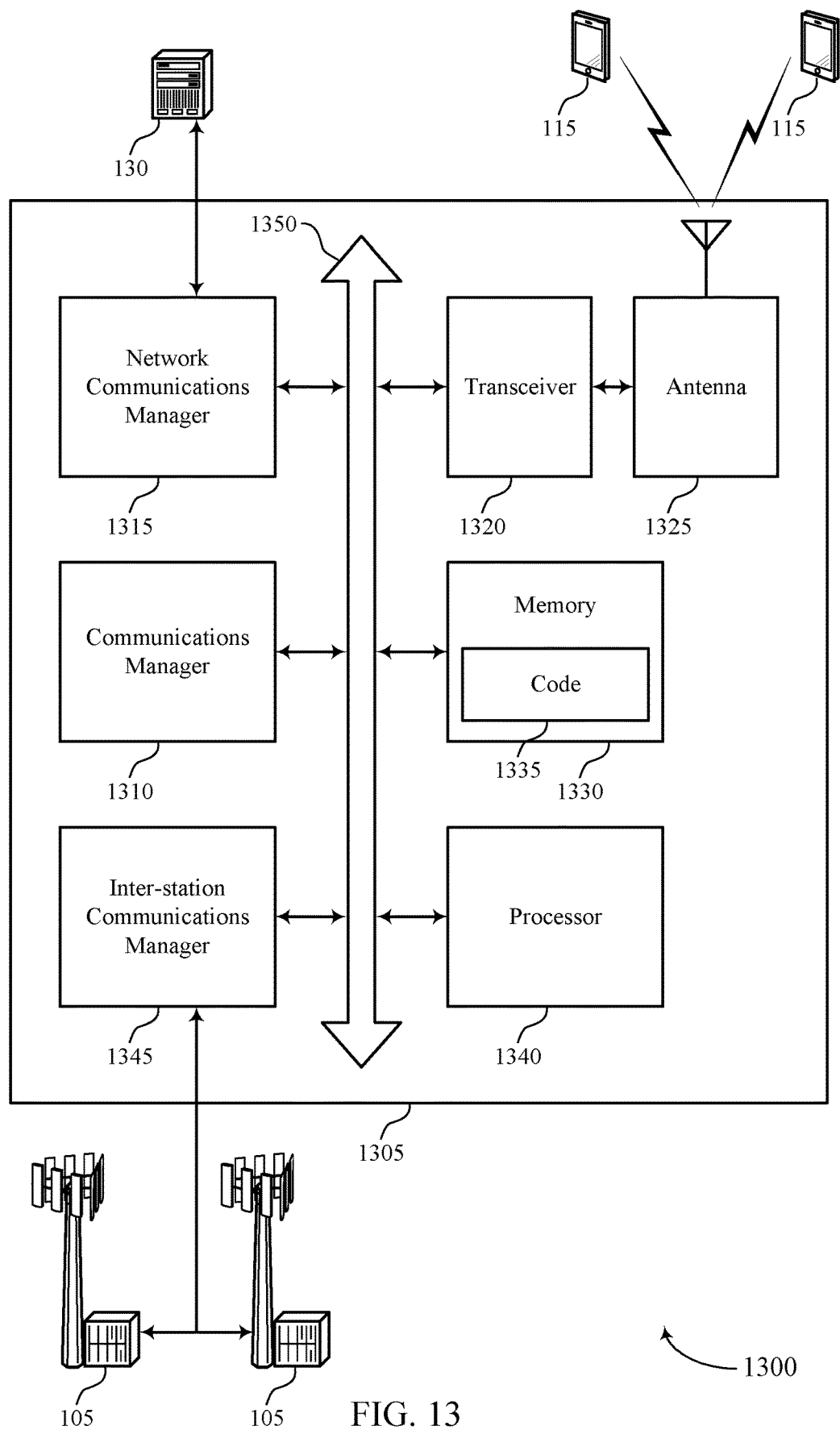
FIG. 13 shows a diagram of a system including a device that supports feedback techniques for group-common PDCCH transmissions in accordance with aspects of the present disclosure.

FIG. 13 shows a diagram of a system 1300 including a device 1305 that supports feedback techniques for group-common PDCCH transmissions in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a first group downlink control information transmission associated with a UE group, the first group downlink control information transmission referencing a second group downlink control information transmission, transmit the second group downlink control information transmission based on the first group downlink control information transmission, and receive feedback information for the second group downlink control information transmission. The communications manager 1310 may also transmit a first group downlink control information transmission associated with a UE group, transmit the second group downlink control information transmission, the second group downlink control information transmission referencing the first group downlink control information transmission, and receive feedback information for the first group downlink control information transmission.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting feedback techniques for group-common PDCCH transmissions).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
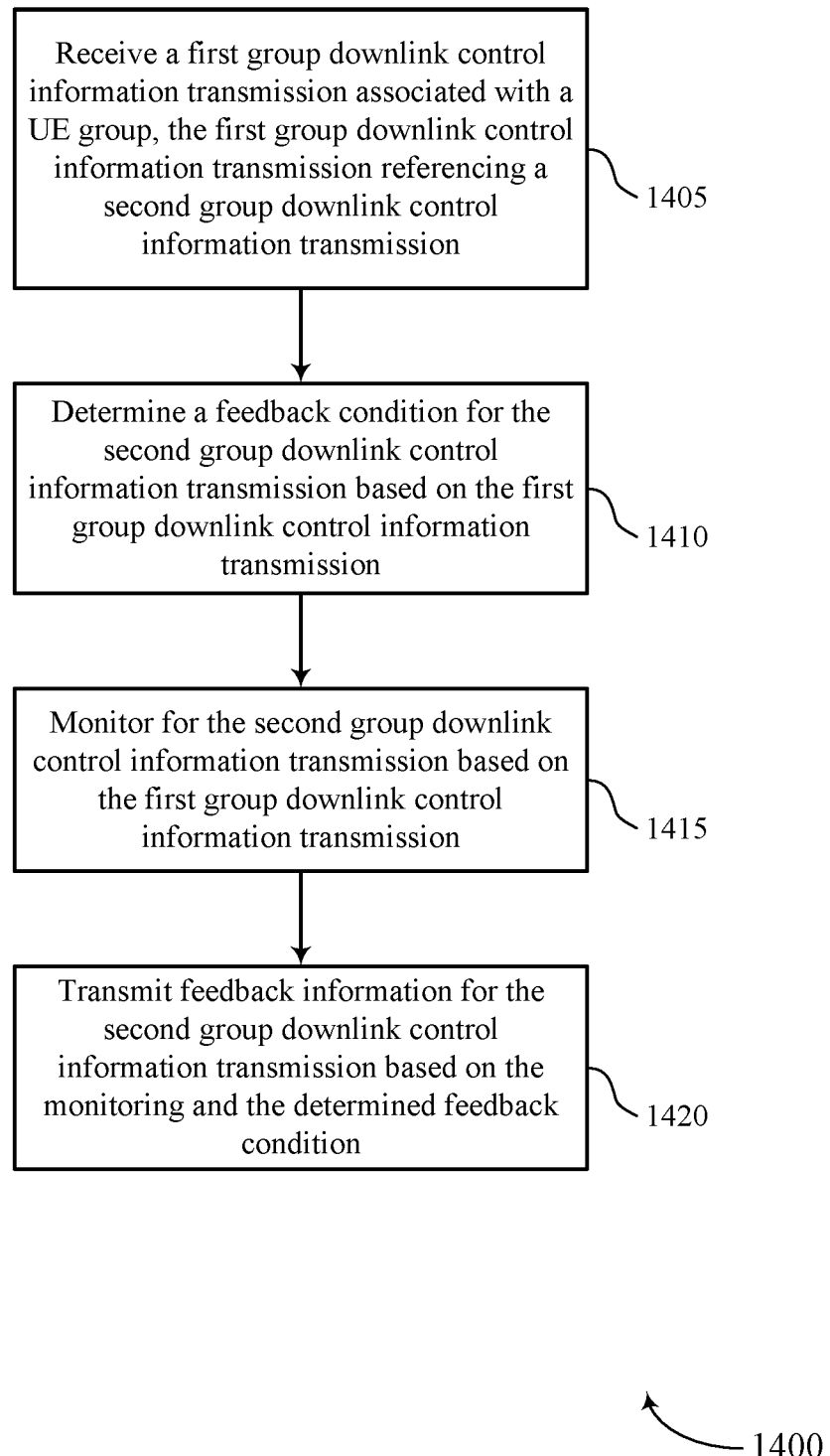
FIGS. 14 through 17 show flowcharts illustrating methods that support feedback techniques for group-common PDCCH transmissions in accordance with aspects of the present disclosure.

FIG. 14 shows a flowchart illustrating a method 1400 that supports feedback techniques for group-common PDCCH transmissions in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a first group downlink control information transmission associated with a UE group, the first group downlink control information transmission referencing a second group downlink control information transmission. The operations of 1405 may be performed according to the methods described herein. In some examples, aspects of the operations of 1405 may be performed by a downlink control information module as described with reference to FIGS. 6 through 9.

At 1410, the UE may determine a feedback condition for the second group downlink control information transmission based on the first group downlink control information transmission. The operations of 1410 may be performed according to the methods described herein. In some examples, aspects of the operations of 1410 may be performed by a feedback module as described with reference to FIGS. 6 through 9.

At 1415, the UE may monitor for the second group downlink control information transmission based on the first group downlink control information transmission. The operations of 1415 may be performed according to the methods described herein. In some examples, aspects of the operations of 1415 may be performed by a monitoring module as described with reference to FIGS. 6 through 9.

At 1420, the UE may transmit feedback information for the second group downlink control information transmission based on the monitoring and the determined feedback condition. The operations of 1420 may be performed according to the methods described herein. In some examples, aspects of the operations of 1420 may be performed by a feedback module as described with reference to FIGS. 6 through 9.

Figure 15:
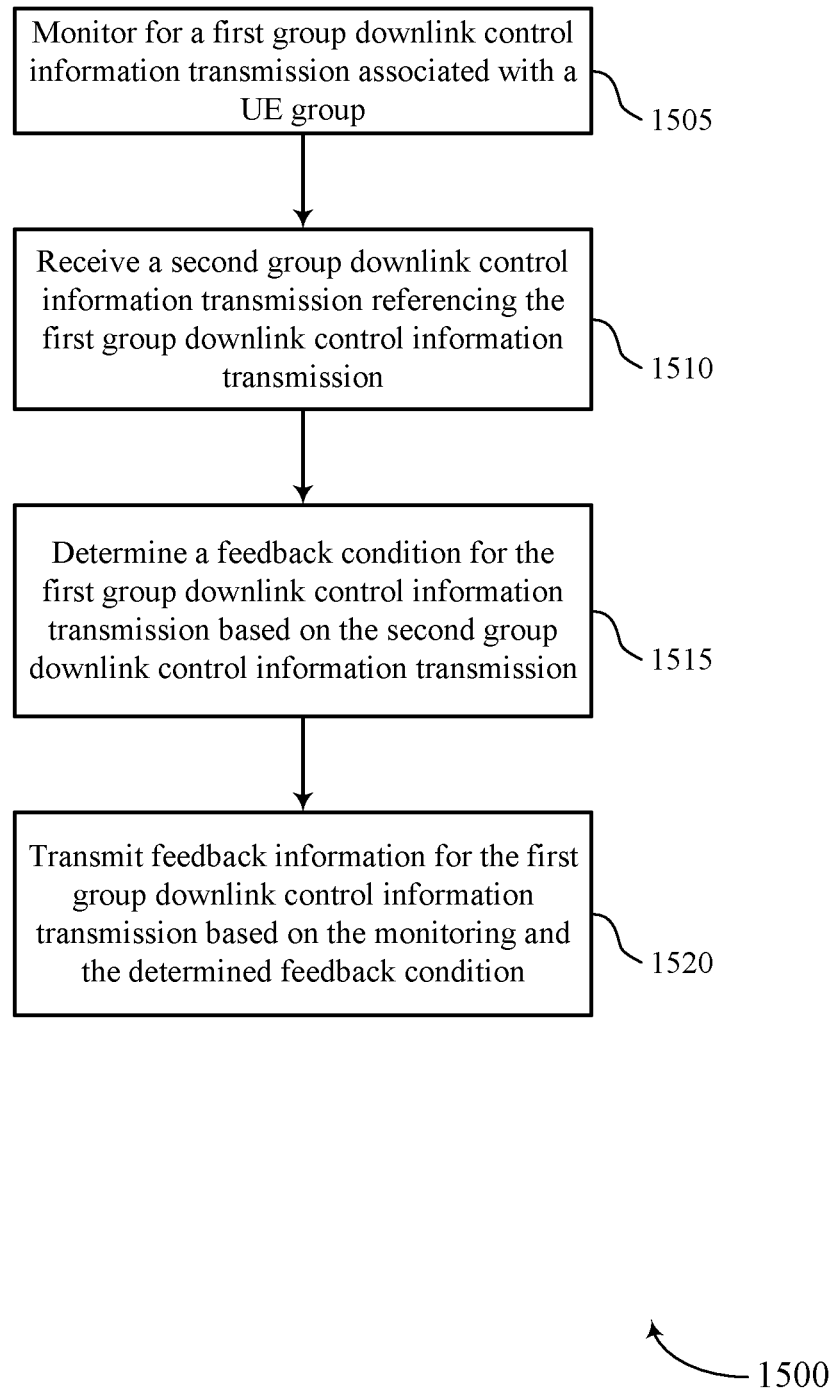

FIG. 15 shows a flowchart illustrating a method 1500 that supports feedback techniques for group-common PDCCH transmissions in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may monitor for a first group downlink control information transmission associated with a UE group. The operations of 1505 may be performed according to the methods described herein. In some examples, aspects of the operations of 1505 may be performed by a monitoring module as described with reference to FIGS. 6 through 9.

At 1510, the UE may receive a second group downlink control information transmission referencing the first group downlink control information transmission. The operations of 1510 may be performed according to the methods described herein. In some examples, aspects of the operations of 1510 may be performed by a downlink control information module as described with reference to FIGS. 6 through 9.

At 1515, the UE may determine a feedback condition for the first group downlink control information transmission based on the second group downlink control information transmission. The operations of 1515 may be performed according to the methods described herein. In some examples, aspects of the operations of 1515 may be performed by a feedback module as described with reference to FIGS. 6 through 9.

At 1520, the UE may transmit feedback information for the first group downlink control information transmission based on the monitoring and the determined feedback condition. The operations of 1520 may be performed according to the methods described herein. In some examples, aspects of the operations of 1520 may be performed by a feedback module as described with reference to FIGS. 6 through 9.

Figure 16:
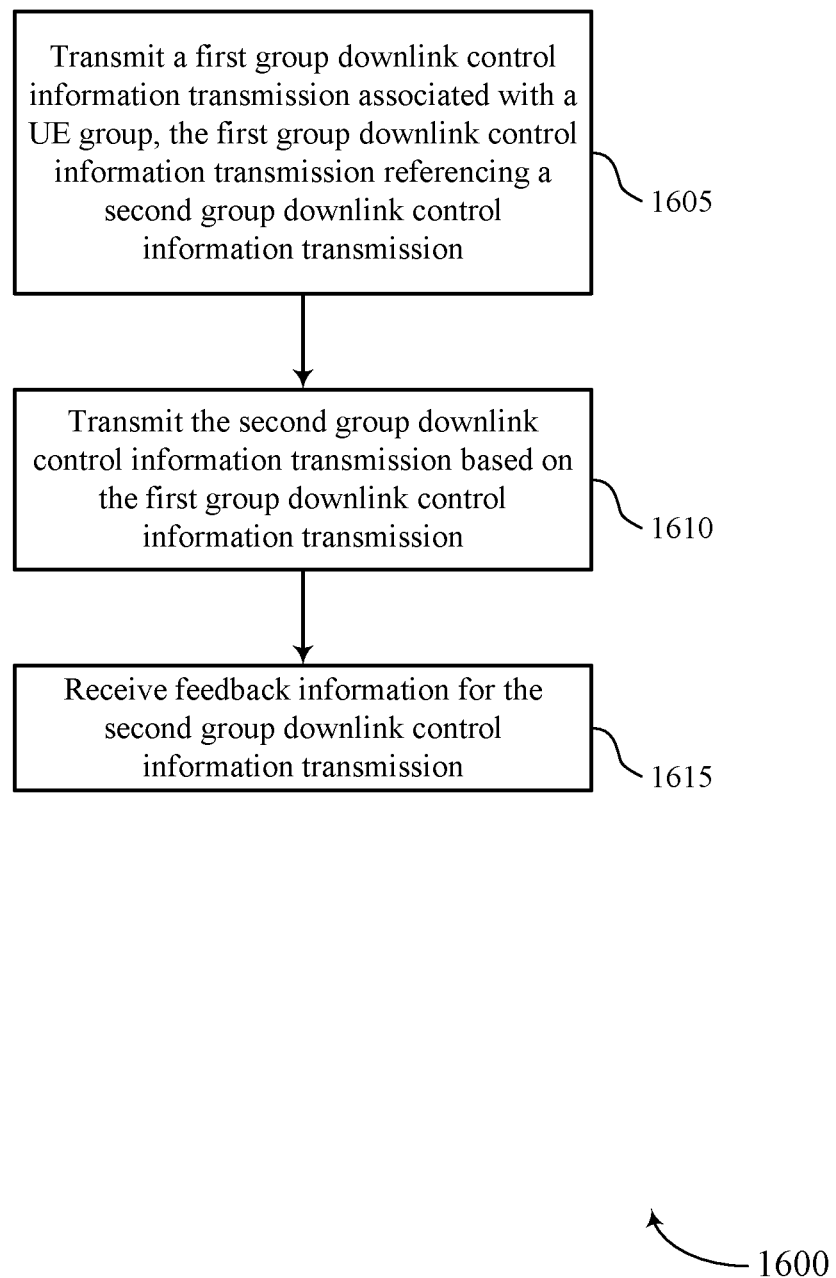

FIG. 16 shows a flowchart illustrating a method 1600 that supports feedback techniques for group-common PDCCH transmissions in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit a first group downlink control information transmission associated with a UE group, the first group downlink control information transmission referencing a second group downlink control information transmission. The operations of 1605 may be performed according to the methods described herein. In some examples, aspects of the operations of 1605 may be performed by a downlink control information manager as described with reference to FIGS. 10 through 13.

At 1610, the base station may transmit the second group downlink control information transmission based on the first group downlink control information transmission. The operations of 1610 may be performed according to the methods described herein. In some examples, aspects of the operations of 1610 may be performed by a downlink control information manager as described with reference to FIGS. 10 through 13.

At 1615, the base station may receive feedback information for the second group downlink control information transmission. The operations of 1615 may be performed according to the methods described herein. In some examples, aspects of the operations of 1615 may be performed by a feedback manager as described with reference to FIGS. 10 through 13.

Figure 17:
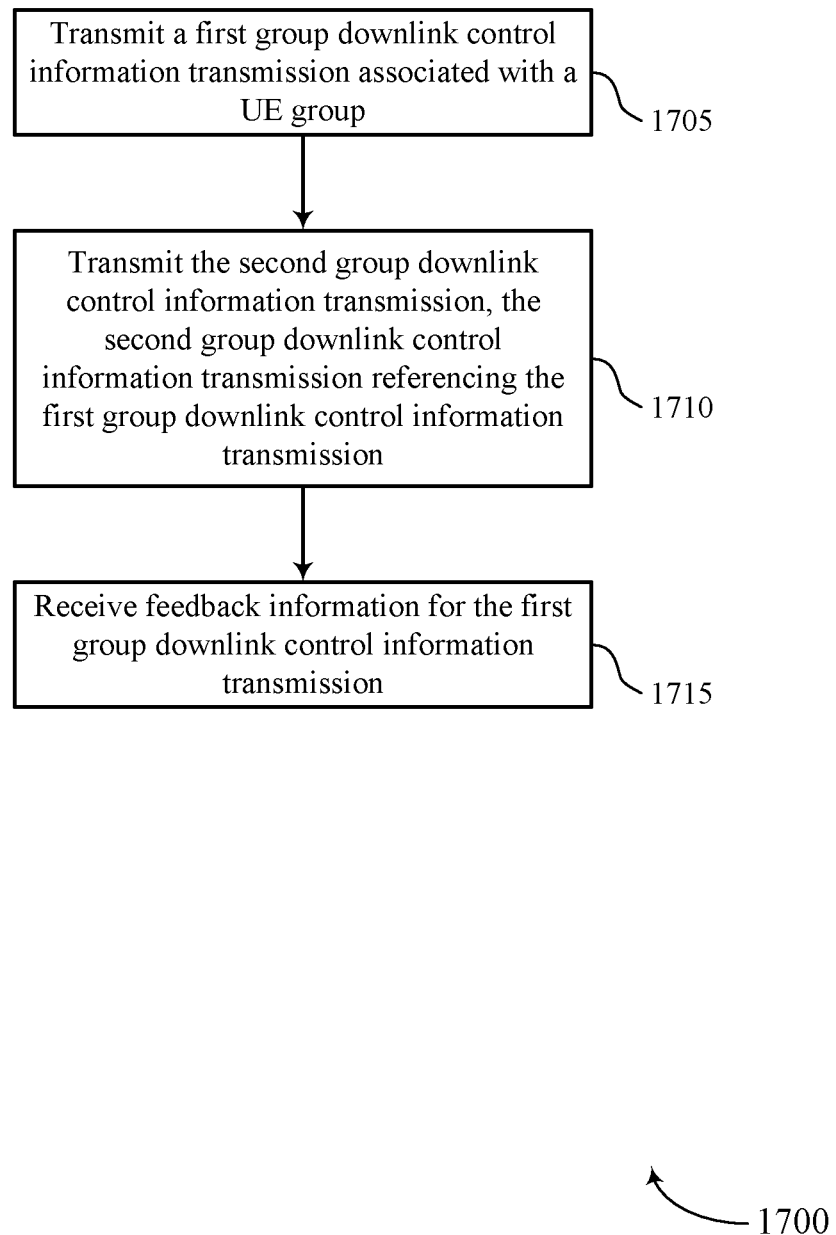

FIG. 17 shows a flowchart illustrating a method 1700 that supports feedback techniques for group-common PDCCH transmissions in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit a first group downlink control information transmission associated with a UE group. The operations of 1705 may be performed according to the methods described herein. In some examples, aspects of the operations of 1705 may be performed by a downlink control information manager as described with reference to FIGS. 10 through 13.

At 1710, the base station may transmit the second group downlink control information transmission, the second group downlink control information transmission referencing the first group downlink control information transmission. The operations of 1710 may be performed according to the methods described herein. In some examples, aspects of the operations of 1710 may be performed by a downlink control information manager as described with reference to FIGS. 10 through 13.

At 1715, the base station may receive feedback information for the first group downlink control information transmission. The operations of 1715 may be performed according to the methods described herein. In some examples, aspects of the operations of 1715 may be performed by a feedback manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving a first group downlink control information transmission associated with a UE group, the first group downlink control information transmission referencing a second group downlink control information transmission; determining a feedback condition for the second group downlink control information transmission based at least in part on the first group downlink control information transmission; monitoring for the second group downlink control information transmission based at least in part on the first group downlink control information transmission; and transmitting feedback information for the second group downlink control information transmission based at least in part on the monitoring and the determined feedback condition.

Aspect 2: The method of aspect 1, further comprising: determining, based at least in part on the monitoring, that the second group downlink control information transmission was not received, wherein the feedback information comprises a negative acknowledgement.

Aspect 3: The method of aspect 2, wherein receiving the first group downlink control information transmission comprises: monitoring a first search space set for the first group downlink control information transmission.

Aspect 4: The method of any of aspects 2 through 3, wherein the first group downlink control information transmission, the second group downlink control information transmission, or both, comprise a monitoring group indication.

Aspect 5: The method of aspect 4, further comprising: switching to a second search space set for monitoring by the UE based at least in part on the monitoring group indication.

Aspect 6: The method of any of aspects 2 through 5, further comprising: receiving a retransmission of at least a portion of the second group downlink control information transmission based at least in part on transmitting the feedback information.

Aspect 7: The method of any of aspects 1 through 6, wherein the first group downlink control information transmission comprises a different downlink control information format than the second group downlink control information transmission.

Aspect 8: The method of any of aspects 1 through 7, wherein the first group downlink control information transmission references a previous group downlink control information transmission, the method further comprising: determining a feedback condition for the previous group downlink control information transmission based at least in part on the first group downlink control information transmission.

Aspect 9: The method of any of aspects 1 through 8, wherein the first group downlink control information transmission references the second group downlink control information transmission using a pre-notification indication.

Aspect 10: The method of aspect 9, wherein the pre-notification indication comprises a single bit indication.

Aspect 11: The method of any of aspects 1 through 10, wherein the first group downlink control information transmission indicates a set of resources for transmitting the feedback information.

Aspect 12: The method of any of aspects 1 through 11, wherein the second group downlink control information transmission is in an immediately subsequent control channel opportunity to the first group downlink control information transmission.

Aspect 13: A method for wireless communication at a UE, comprising: monitoring for a first group downlink control information transmission associated with a UE group; receiving a second group downlink control information transmission referencing the first group downlink control information transmission; determining a feedback condition for the first group downlink control information transmission based at least in part on the second group downlink control information transmission; and transmitting feedback information for the first group downlink control information transmission based at least in part on the monitoring and the determined feedback condition.

Aspect 14: The method of aspect 13, further comprising: determining, based at least in part on the monitoring, that the first group downlink control information transmission was not received, wherein the feedback information comprises a negative acknowledgement.

Aspect 15: The method of aspect 14, wherein receiving the second group downlink control information transmission comprises: monitoring a first search space set for the second group downlink control information transmission.

Aspect 16: The method of any of aspects 14 through 15, wherein the first group downlink control information transmission, the second group downlink control information transmission, or both, comprise a monitoring group indication.

Aspect 17: The method of aspect 16, further comprising: switching to a second search space set for monitoring by the UE based at least in part on the monitoring group indication.

Aspect 18: The method of any of aspects 14 through 17, further comprising: receiving a retransmission of at least a portion of the first group downlink control information transmission based at least in part on transmitting the feedback information.

Aspect 19: The method of any of aspects 13 through 18, wherein the first group downlink control information transmission comprises a different downlink control information format than the second group downlink control information transmission.

Aspect 20: The method of any of aspects 13 through 19, wherein the first group downlink control information transmission references a third group downlink control information transmission, the method further comprising: determining a feedback condition for the third group downlink control information transmission based at least in part on the first group downlink control information transmission.

Aspect 21: The method of any of aspects 13 through 20, wherein the second group downlink control information transmission references the first group downlink control information transmission using a post-confirmation indication.

Aspect 22: The method of aspect 21, wherein the post-confirmation indication comprises a single bit indication.

Aspect 23: The method of any of aspects 13 through 22, wherein the second group downlink control information transmission indicates a set of resources for transmitting the feedback information.

Aspect 24: The method of any of aspects 13 through 23, wherein the first group downlink control information transmission is in a control channel opportunity immediately preceding the second group downlink control information transmission.

Aspect 25: A method for wireless communication at a base station, comprising: transmitting a first group downlink control information transmission associated with a UE group, the first group downlink control information transmission referencing a second group downlink control information transmission; transmitting the second group downlink control information transmission based at least in part on the first group downlink control information transmission; and receiving feedback information for the second group downlink control information transmission.

Aspect 26: The method of aspect 25, further comprising: determining, based at least in part on receiving the feedback information, that the second group downlink control information transmission was not received at a UE of the UE group, wherein the feedback information comprises a negative acknowledgement.

Aspect 27: The method of aspect 26, further comprising: retransmitting at least a portion of the second group downlink control information transmission based at least in part on transmitting the feedback information.

Aspect 28: The method of any of aspects 25 through 27, wherein the first group downlink control information transmission, the second group downlink control information transmission, or both, comprise a monitoring group indication.

Aspect 29: The method of any of aspects 25 through 28, wherein the first group downlink control information transmission comprises a different downlink control information format than the second group downlink control information transmission.

Aspect 30: The method of any of aspects 25 through 29, wherein the first group downlink control information transmission references a previous group downlink control information transmission, the method further comprising: receiving feedback information for the previous group downlink control information transmission.

Aspect 31: The method of any of aspects 25 through 30, wherein the first group downlink control information transmission references the second group downlink control information transmission using a pre-notification indication.

Aspect 32: The method of aspect 31, wherein the pre-notification indication comprises a single bit indication.

Aspect 33: The method of any of aspects 25 through 32, wherein the first group downlink control information transmission indicates a set of resources for transmitting the feedback information.

Aspect 34: The method of any of aspects 25 through 33, wherein the second group downlink control information transmission is in an immediately subsequent control channel opportunity to the first group downlink control information transmission.

Aspect 35: A method for wireless communication at base station, comprising: transmitting a first group downlink control information transmission associated with a UE group; transmitting a second group downlink control information transmission, the second group downlink control information transmission referencing the first group downlink control information transmission; and receiving feedback information for the first group downlink control information transmission.

Aspect 36: The method of aspect 35, further comprising: determining, based at least in part on receiving the feedback information, that the first group downlink control information transmission was not received at the UE, wherein the feedback information comprises a negative acknowledgement.

Aspect 37: The method of aspect 36, further comprising: retransmitting at least a portion of the first group downlink control information transmission based at least in part on transmitting the feedback information.

Aspect 38: The method of any of aspects 35 through 37, wherein the first group downlink control information transmission, the second group downlink control information transmission, or both, comprise a monitoring group indication.

Aspect 39: The method of any of aspects 35 through 38, wherein the first group downlink control information transmission comprises a different downlink control information format than the second group downlink control information transmission.

Aspect 40: The method of any of aspects 35 through 39, wherein the first group downlink control information transmission references a third group downlink control information transmission, the method further comprising: receiving feedback information for the third group downlink control information transmission.

Aspect 41: The method of any of aspects 35 through 40, wherein the first group downlink control information transmission references the second group downlink control information transmission using a post-confirmation indication.

Aspect 42: The method of aspect 41, wherein the post-confirmation indication comprises a single bit indication.

Aspect 43: The method of any of aspects 35 through 42, wherein the second group downlink control information transmission indicates a set of resources for transmitting the feedback information.

Aspect 44: The method of any of aspects 35 through 43, wherein the first group downlink control information transmission is in a control channel opportunity immediately preceding the second group downlink control information transmission.

Aspect 45: An apparatus for wireless communication at a UE, comprising a processor; memory coupled with the processor; and instructions stored in the memory and executable by the processor to cause the apparatus to perform a method of any of aspects 1 through 12.

Aspect 46: An apparatus for wireless communication at a UE, comprising at least one means for performing a method of any of aspects 1 through 12.

Aspect 47: A non-transitory computer-readable medium storing code for wireless communication at a UE, the code comprising instructions executable by a processor to perform a method of any of aspects 1 through 12.

Aspect 48: An apparatus for wireless communication at a UE, comprising a processor; memory coupled with the processor; and instructions stored in the memory and executable by the processor to cause the apparatus to perform a method of any of aspects 13 through 24.

Aspect 49: An apparatus for wireless communication at a UE, comprising at least one means for performing a method of any of aspects 13 through 24.

Aspect 50: A non-transitory computer-readable medium storing code for wireless communication at a UE, the code comprising instructions executable by a processor to perform a method of any of aspects 13 through 24.

Aspect 51: An apparatus for wireless communication at a base station, comprising a processor; memory coupled with the processor; and instructions stored in the memory and executable by the processor to cause the apparatus to perform a method of any of aspects 25 through 34.

Aspect 52: An apparatus for wireless communication at a base station, comprising at least one means for performing a method of any of aspects 25 through 34.

Aspect 53: A non-transitory computer-readable medium storing code for wireless communication at a base station, the code comprising instructions executable by a processor to perform a method of any of aspects 25 through 34.

Aspect 54: An apparatus for wireless communication at base station, comprising a processor; memory coupled with the processor; and instructions stored in the memory and executable by the processor to cause the apparatus to perform a method of any of aspects 35 through 44.

Aspect 55: An apparatus for wireless communication at base station, comprising at least one means for performing a method of any of aspects 35 through 44.

Aspect 56: A non-transitory computer-readable medium storing code for wireless communication at base station, the code comprising instructions executable by a processor to perform a method of any of aspects 35 through 44

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
a processor;
memory coupled with the processor; and
instructions stored in the memory and executable by the processor to cause the apparatus to:
    receive a first group downlink control information transmission associated with a UE group, the first group downlink control information transmission comprising an indication for a second group downlink control information transmission;
    monitor for the second group downlink control information transmission based at least in part on the first group downlink control information transmission; and
    transmit feedback information for the second group downlink control information transmission based at least in part on the indication for the second group downlink control information transmission.

2. The apparatus of claim 1, wherein the instructions to transmit the feedback information are further executable by the processor to cause the apparatus to:
    transmit the feedback information based at least in part on a feedback condition associated with the indication for the second group downlink control information transmission.

3. The apparatus of claim 2, wherein the instructions to transmit the feedback information are executable by the processor to cause the apparatus to:
    determine that the second group downlink control information transmission was not received according to the indication; and
    transmit negative feedback based at least in part on the feedback condition.

4. The apparatus of claim 1, wherein the indication for the second group downlink control information transmission signals a search space set to monitor.

5. The apparatus of claim 1, wherein the second group downlink control information transmission is within a subsequent control channel opportunity to the first group downlink control information transmission.

6. The apparatus of claim 1, wherein the instructions are further executable by the processor to cause the apparatus to:
    receive a first switching flag in a first downlink control information; and
    switch monitoring from a first search space set associated with the first group downlink control information transmission to a second search space set associated with the second group downlink control information transmission based at least in part on the first switching flag.

7. The apparatus of claim 6, wherein the instructions are further executable by the processor to cause the apparatus to:
    start an inactivity timer upon switching monitoring to the second search space set; and
    upon expiration of the inactivity timer, switch monitoring from the second search space set to the first search space set.

8. The apparatus of claim 6, wherein the instructions are further executable by the processor to cause the apparatus to:
    receive a second switching flag in a second downlink control information; and
    restart an inactivity timer while continuing to monitor the second search space set.

9. An apparatus, comprising:
a processor;
memory coupled with the processor; and
instructions stored in the memory and executable by the processor to cause the apparatus to:
    monitor for a first group downlink control information transmission;
    receive a second group downlink control information transmission comprising an indication for the first group downlink control information transmission; and
    transmit feedback information for the first group downlink control information transmission based at least in part on the indication for the first group downlink control information transmission.

10. The apparatus of claim 9, wherein the instructions to transmit the feedback information are further executable by the processor to cause the apparatus to:
    transmit the feedback information based at least in part on a first feedback condition for the first group downlink control information transmission associated with the indication.

11. The apparatus of claim 10, wherein the instructions to transmit the feedback information are executable by the processor to cause the apparatus to:

determine that the first group downlink control information transmission was not received according to the indication; and transmit negative feedback based at least in part on the first feedback condition.

12. The apparatus of claim 10, wherein the second group downlink control information transmission references a third group downlink control information transmission, wherein the instructions are further executable by the processor to cause the apparatus to:

determine a second feedback condition for the third group downlink control information transmission based at least in part on the second group downlink control information transmission.

13. The apparatus of claim 10, wherein the instructions are further executable by the processor to cause the apparatus to:

receive a first switching flag in a first downlink control information; and switch monitoring from a first search space set associated with the first group downlink control information transmission to a second search space set associated with the second group downlink control information transmission based at least in part on the first switching flag.

14. The apparatus of claim 13, wherein the instructions are further executable by the processor to cause the apparatus to:

start an inactivity timer upon switching monitoring to the second search space set; and upon expiration of the inactivity timer, switch monitoring from the second search space set to the first search space set.

15. The apparatus of claim 13, wherein the instructions are further executable by the processor to cause the apparatus to:

receive a second switching flag in a second downlink control information; and restart an inactivity timer while continuing to monitor the second search space set.

16. The apparatus of claim 9, wherein the second group downlink control information transmission indicates a set of resources for transmitting the feedback information.

17. The apparatus of claim 9, wherein the first group downlink control information transmission is in a control channel opportunity preceding the second group downlink control information transmission.

18. A method for wireless communication at a user equipment (UE), comprising:

receiving a first group downlink control information transmission associated with a UE group, the first group downlink control information transmission comprising an indication for a second group downlink control information transmission;

monitoring for the second group downlink control information transmission based at least in part on the first group downlink control information transmission; and transmitting feedback information for the second group downlink control information transmission based at least in part on the indication for the second group downlink control information transmission.

19. The method of claim 18, wherein transmitting the feedback information is based at least in part on a feedback condition associated with the indication for the second group downlink control information transmission.

20. The method of claim 19, wherein transmitting the feedback information further comprises:

determining that the second group downlink control information transmission was not received according to the indication; and transmitting negative feedback based at least in part on the feedback condition.

\* \* \* \* \*